US012203452B2

(12) United States Patent
Andreasen et al.

(10) Patent No.: US 12,203,452 B2
(45) Date of Patent: Jan. 21, 2025

(54) MODULAR COOLER TOP FOR A WIND TURBINE AND METHOD OF ASSEMBLING SAME

(71) Applicant: Vestas Wind Systems A/S, Aarhus N (DK)

(72) Inventors: Marcin Blazniak Andreasen, Hovedgård (DK); Jesper Nyvad, Egå (DK); Renato Catroga, Egå (DK); Torben Ladegaard Baun, Skødstrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/276,674

(22) PCT Filed: Feb. 9, 2022

(86) PCT No.: PCT/DK2022/050022
§ 371 (c)(1),
(2) Date: Aug. 10, 2023

(87) PCT Pub. No.: WO2022/171255
PCT Pub. Date: Aug. 18, 2022

(65) Prior Publication Data
US 2024/0102454 A1 Mar. 28, 2024

(30) Foreign Application Priority Data
Feb. 11, 2021 (DK) .......................... PA 2021 70063

(51) Int. Cl.
*F03D 80/60* (2016.01)
*F03D 1/00* (2006.01)

(52) U.S. Cl.
CPC .......... *F03D 80/602* (2023.08); *F03D 1/101* (2023.08); *F05B 2220/30* (2013.01); *F05B 2240/14* (2013.01); *F05B 2260/20* (2013.01)

(58) Field of Classification Search
CPC .............................. F03D 80/602; F03D 1/101
See application file for complete search history.

(56) References Cited

U.S. PATENT DOCUMENTS

| 2012/0086215 A1 | 4/2012 | Sivalingam et al. |
| 2020/0200152 A1 | 6/2020 | Grant et al. |
| 2021/0381495 A1* | 12/2021 | Mørkholt ................ F03D 80/60 |

FOREIGN PATENT DOCUMENTS

| EP | 2546515 A1 | 1/2013 |
| EP | 2673499 B1 | 10/2017 |

(Continued)

OTHER PUBLICATIONS

International Searching Authority, International Search Report and Written Opinion issued in corresponding PCT Application No. OCT/DK2022/050022, mailed Apr. 22, 2022.

(Continued)

*Primary Examiner* — Brian O Peters
(74) *Attorney, Agent, or Firm* — Wood Herron & Evans LLP

(57) ABSTRACT

A wind turbine (10) includes a nacelle (14) with a longitudinal axis (LA) aligned with the flow of the incoming wind during operation. When so aligned, the nacelle defines a longitudinal direction (X). The wind turbine (10) includes one or more heat-generating components (22) and a modular cooler (24) operatively coupled to the one or more heat-generating components (22). The modular cooler (24) includes one or more cooling modules (30) with each including one or more cooling units (32). Each cooling unit (32) includes a heat exchanger (40) defining a cooling area (38), which defines a normal axis (NA) and a deflector plate (Continued)

(42) to divert the flow of the incoming wind by an angle less than 180° relative to the longitudinal direction (X). Each cooling unit (32) is oriented such that the normal axis (NA) is non-parallel to the longitudinal axis (LA). The modular cooler (24) is scalable in multiple dimensions to increase the cooling capacity of the cooler (24). A method of assembling the modular cooler (24) is also disclosed.

20 Claims, 19 Drawing Sheets

(56) References Cited

FOREIGN PATENT DOCUMENTS

| | | |
|---|---:|---|
| EP | 3636917 A1 | 4/2020 |
| EP | 3663576 A1 | 6/2020 |
| WO | 2014037080 A1 | 3/2014 |
| WO | 2020115276 A1 | 6/2020 |

OTHER PUBLICATIONS

Danish Patent and Trademark Office, technical examination issued in corresponding DK Application No. PA 2021 70063, mailed Aug. 18, 2021.

\* cited by examiner

MODULAR COOLER TOP FOR A WIND TURBINE AND METHOD OF ASSEMBLING SAME

TECHNICAL FIELD

This invention relates generally to wind turbines, and more particularly to a modular cooler top for a wind turbine that is scalable in multiple dimensions for increasing the cooling capacity of the cooler top, and a method for assembling such a modular cooler top.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades and supported in the nacelle by means of a shaft. The shaft couples the rotor either directly or indirectly with a generator, which is housed inside the nacelle. Consequently, as wind forces the blades to rotate, electrical energy is produced by the generator.

Components of the generator located within the nacelle generate significant heat during operation, which in turn, causes the temperature of the air in the nacelle and the generator components to increase. When the generator components are heated, the overall efficiency of power generation may be decreased. Therefore, the generator components and the nacelle may be cooled to ensure that the heat does not adversely affect power generation and/or damage the components.

Conventional wind turbines may include one or more cooling devices configured to remove the heat generated during operation of the wind turbine. The cooling devices may include standard heat sinks. Another exemplary cooling device is a cooler top positioned along one side (e.g., the roof or sides) of the nacelle and including one or more panels partially enclosed by a cover. The air flowing past the wind turbine cools a second fluid flowing through the panels, the second fluid being directed to other heat exchangers within the nacelle to remove heat from generator components and the nacelle. To this end, the cooling devices operate to thereby reduce the temperature of the nacelle and the generator components.

In present cooler top designs, the panels have a cooling area that is arranged to directly face the incoming wind. In other words, the plane of the cooling area is arranged perpendicular to the incoming wind. While this arrangement of the panels is sufficient for its intended purpose, there are some drawbacks to such a design. For example, as the power production per wind turbine increases, so does the required cooling capacity. Increasing cooling capacity with the present cooler top designs may be accomplished by scaling in two directions, i.e., the height of the panel(s) (e.g., in the vertical direction) and the width of the panel(s) (e.g., in the horizontal direction). There is, however, a practical limit as to how high and how wide a panel or series of panels may be made on top of a nacelle. In this regard, the width of the panel(s) is generally limited by the width of the nacelle to which the cooler top is attached. Moreover, the height of the panel(s) may be bound by strength limitations in the structure that supports the panel(s) on the nacelle.

Thus, there remains a need for cooler top designs that provide improved cooling capacity. More particularly, there is need for a cooler top design that is scalable in more than two dimensions to provide a still higher cooling capacity.

SUMMARY

To these and other ends, a wind turbine a tower a nacelle rotatably coupled to the tower. The nacelle has a longitudinal axis configured to be aligned with the direction of the flow of the incoming wind during operation of the wind turbine. When the nacelle is so aligned, it defines a longitudinal direction, a traverse direction, and a vertical direction. The wind turbine includes one or more heat-generating components housed in the wind turbine and a modular cooler affixed to the nacelle and operatively coupled to the one or more heat-generating components for cooling the heat-generating components. The modular cooler comprising one or more cooling modules, where each cooling module including one or more cooling units. Each cooling unit further includes a heat exchanger defining a cooling area that defines a normal axis and a deflector plate to direct the incoming wind through the heat exchanger by diverting the flow of the incoming wind by an angle that is less than 180° relative to the longitudinal direction. Each of the one or more cooling units of the modular cooler is oriented such that the normal axis of the heat exchanger is non-parallel to the longitudinal axis of the nacelle.

In one embodiment, the deflector plate defines a plane forming an angle with the longitudinal direction that is less than 180°.

In one embodiment, the one or more cooling modules may include a plurality of cooling units arranged adjacent each other along at least one of the longitudinal direction, traverse direction, and vertical direction. In these embodiments, the cooling units form building blocks that allow the modular cooler to be scaled in multiple directions, i.e., in the longitudinal direction, traverse direction, and vertical direction. In another embodiment, the modular cooler may include a plurality of cooling modules arranged adjacent each other along at least one of the longitudinal direction, traverse direction, and vertical direction. In these embodiments, the cooling modules form building blocks that allow the modular cooler to be scaled in multiple directions, i.e., in the longitudinal direction, traverse direction, and vertical direction.

In an embodiment, the heat exchanger may include one or more heat transfer panels. In one aspect of this embodiment, the heat exchanger includes a plurality of heat transfer panels arranged adjacent each other in the longitudinal direction of the nacelle and the deflector plate is positioned relative to the heat exchanger such that the incoming wind is directed to each of the plurality of heat transfer panels.

In one embodiment, the heat exchanger is oriented such that the normal axis is substantially parallel to the vertical direction. In another embodiment, the heat exchanger is oriented such that the normal axis is substantially parallel to the transverse direction.

In one embodiment, each cooling unit includes first and second side walls positioned at opposing ends of the deflector plate. The first and second side walls cooperate with the deflector plate to direct the incoming wind through the heat exchanger.

The invention also contemplates a method assembling a modular cooler on a nacelle of a wind turbine, where the nacelle has a longitudinal axis configured to be aligned with the direction of the flow of the incoming wind during operation of the wind turbine. When the nacelle is so aligned, it defines a longitudinal direction, a traverse direction, and a vertical direction. The method includes providing one or more cooling modules, where each cooling module includes one or more cooling units. Each cooling unit includes a heat exchanger having a cooling area that defines a normal axis and a deflector plate, which may define a plane. The method further includes attaching the one or more cooling modules to the nacelle in an orientation such that the normal axis of the heat exchanger of the one or more cooling units is non-parallel to the longitudinal axis of the nacelle. The method further includes positioning the deflector plate relative to the heat exchanger of the one or more cooling units such that the flow of the incoming wind is diverted by an angle that is less than 180° relative to the longitudinal direction to thereby direct the flow of the incoming wind through the heat exchanger.

In one aspect, the one or more cooling modules includes a plurality of cooling units and the step of attaching the one or more cooling units includes arranging the plurality of cooling units adjacent each other in a direction along at least one of the longitudinal direction, traverse direction, and vertical direction. For example, the cooling units may be arranged adjacent to each other in only the longitudinal direction, in both the longitudinal and traverse directions, or in the longitudinal, traverse, and vertical directions, or in any combination of the three directions.

In another aspect, the modular cooler includes a plurality of cooling modules and the step of attaching the one or more cooling modules includes arranging the plurality of cooling modules adjacent each other along at least one of the longitudinal direction, traverse direction, and vertical direction. For example, the cooling modules may be arranged adjacent to each other in only the longitudinal direction, in both the longitudinal and traverse directions, or in the longitudinal, traverse, and vertical directions, or in any combination of the three directions.

In one embodiment, the heat exchanger includes a plurality of heat transfer panels and the step of attaching the one or more cooling modules includes arranging the plurality of heat transfer panels adjacent each other in the longitudinal direction of the nacelle and the step of positioning the deflector plate includes positioning the deflector plate relative to the heat exchanger such that the incoming wind is directed to each of the plurality of heat transfer panels.

In one embodiment, the step of attaching the one or more cooling modules includes orienting the heat exchanger such that the normal axis is substantially parallel to the vertical direction. In another embodiment, the step of attaching the one or more cooling modules includes orienting the heat exchanger such that the normal axis is substantially parallel to the transverse direction.

In one embodiment, the method further includes positioning first and second side walls at opposing ends of the deflector plate, wherein the first and second side walls cooperate with the deflector plate to direct incoming wind through the heat exchanger.

Another embodiment is directed to a modular cooler for a nacelle of a wind turbine, where the nacelle has a longitudinal axis configured to be aligned with the direction of the flow of the incoming wind during operation of the wind turbine. When the nacelle is so aligned, it defines a longitudinal direction, a traverse direction, and a vertical direction. The modular cooler includes one or more cooling modules, where each cooling module includes one or more cooling units. Each cooling unit includes a heat exchanger having a cooling area defining normal axis and a deflector plate to direct the incoming wind through the heat exchanger during operation of the wind turbine by diverting the flow of the incoming wind by an angle that is less than 180° relative to the longitudinal direction. Each of the one or more cooling units of the modular cooler is configured to be oriented such that the normal axis of the heat exchanger is non-parallel to the longitudinal axis of the nacelle when the modular cooler is affixed to the nacelle.

In one embodiment the one or more cooling modules includes a plurality of cooling units configured to be arranged adjacent each other along at least one of the longitudinal direction, traverse direction, and vertical direction. In another embodiment, the modular cooler includes a plurality of cooling modules configured to be arranged adjacent each other along at least one of the longitudinal direction, traverse direction, and vertical direction.

In one aspect, the heat exchanger includes a plurality of heat transfer panels configured to be arranged adjacent each other in the longitudinal direction of the nacelle. In another aspect, the heat exchanger is configured to be oriented such that the normal axis is substantially parallel to the vertical direction or the transverse direction.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
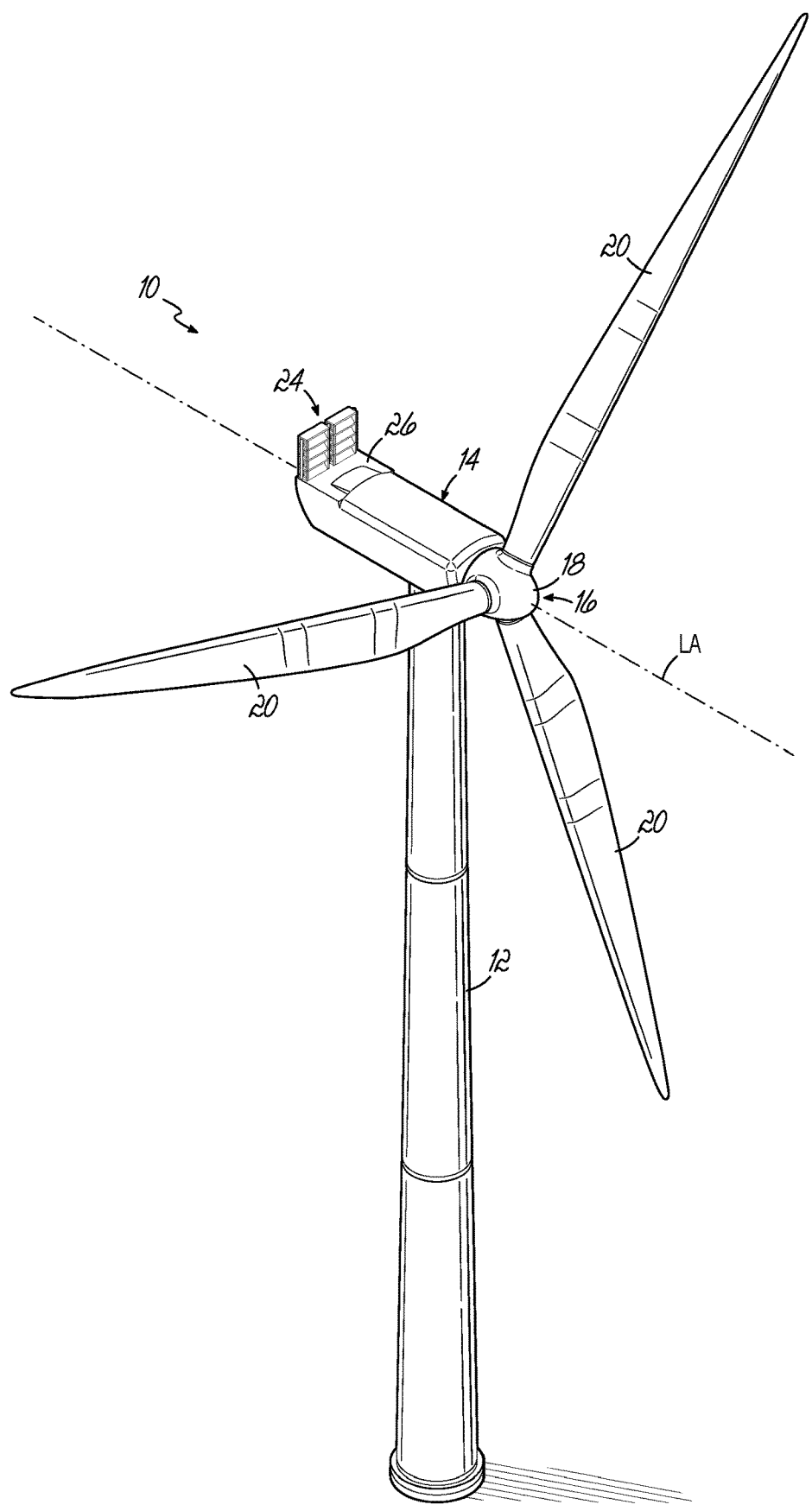
FIG. 1 is a perspective view of a wind turbine having a two-module cooler in accordance with an embodiment of the invention.
Figure 2:
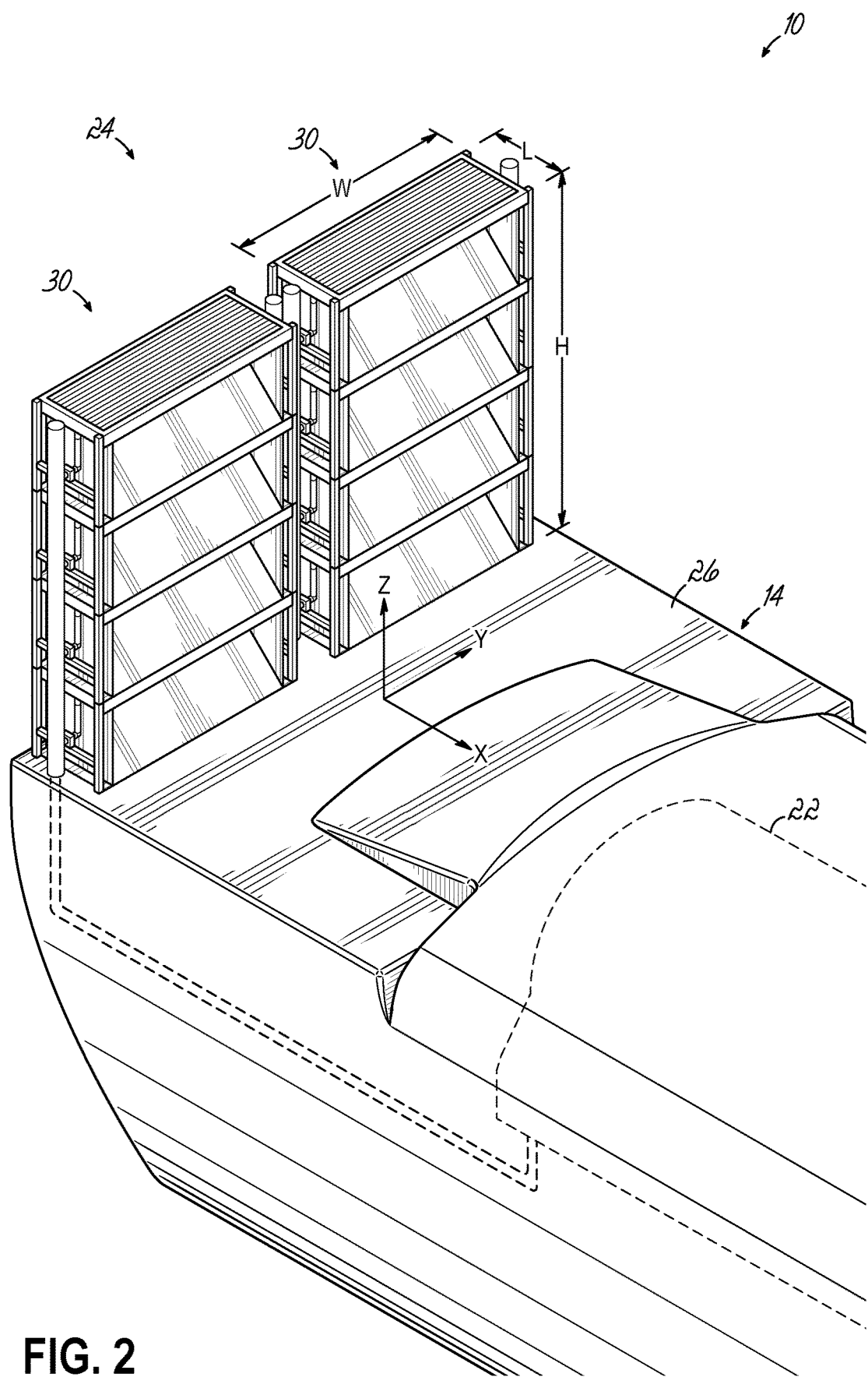
FIG. 2 is an enlarged partial perspective view of the wind turbine of FIG. 1 with the two-module cooler of FIG. 1.

With reference to FIG. 1, a wind turbine 10 includes a tower 12, a nacelle 14 disposed at the apex of the tower 12, and a rotor 16 operatively coupled to a generator (not shown) housed inside the nacelle, and a gearbox (not shown) also housed inside the nacelle 14. In addition to the generator and gearbox, the nacelle 14 may house various components needed to convert wind energy into electrical energy and to operate and optimize the performance of the wind turbine 10. The tower 12 supports the load presented by the nacelle 14, rotor 16, and other wind turbine components housed inside the nacelle 14 and operates to elevate the nacelle 14 and rotor 16 to a height above ground level or sea level, as may be the case, at which air currents having lower turbulence and higher velocity are typically found. The nacelle 14 has a longitudinal axis LA that is configured to be aligned with the direction of the flow of the incoming wind during the operation of the wind turbine. When longitudinal axis (LA) is so aligned, the nacelle defines a longitudinal direction (X), a transverse direction (Y), and a vertical direction (Z) as illustrated in FIG. 2.

The rotor 16 may include a central hub 18 and a plurality of blades 20 attached to the central hub 18 at locations distributed about the circumference of the central hub 18. In the representative embodiment, the rotor 16 includes three blades 20, however the number may vary. The blades 20, which project radially outward from the central hub 18, are configured to interact with passing air currents to produce rotational forces that cause the central hub 18 to spin about its longitudinal axis. The design, construction, and operation of the blades 20 are familiar to a person having ordinary skill in the art of wind turbine design and may include additional functional aspects to optimize performance. For example, pitch angle control of the blades 20 may be implemented by a pitch control mechanism (not shown) responsive to wind velocity to optimize power production in low wind conditions, and to feather the blades if wind velocity exceeds design limitations.

The rotor 16 may be coupled to the gearbox directly or, as shown, indirectly via by a drive shaft (not shown). Either way, the gearbox transfers the rotation of the rotor 16 through a coupling (not shown) to the generator. Wind exceeding a minimum level may activate the rotor 16, causing the rotor 16 to rotate in a direction substantially perpendicular to the wind, applying torque to the input shaft of the generator. The electrical power produced by the generator may be supplied to a power grid (not shown) or an energy storage system (not shown) for later release to the grid as understood by a person having ordinary skill in the art. In this way, the kinetic energy of the wind may be harnessed by the wind turbine 10 for power generation.

The generator, gearbox, and possibly other components housed in the nacelle 14 generate a significant amount of heat during operation of the wind turbine 10. The generator, gearbox, and other components in the nacelle 14 may be characterized as heat-generating components 22 (FIG. 2). To optimize or improve operation of the wind turbine 10, the heat produced by these heat-generating components 22 must be properly managed and exhausted to the external environment. To this end, the wind turbine 10 may include a cooling system for transferring the heat from the heat-generating components 22 to the external environment. In a typical arrangement, the cooling system includes a thermal circuit having a pump that circulates a working fluid, such as water or other suitable refrigerant, through conduit lines between the heat-generating components 22 in the nacelle 14, tower 12, or other portion of the wind turbine 10, and a heat-exchanging cooler 24. The cooler 24 is positioned external to the nacelle 14 and is typically mounted to a surface of the nacelle 14, such as the roof 26 of the nacelle 14 or one or more sidewalls of the nacelle 14 (not shown). In various alternative embodiments, the cooler 24 may be located at other positions of the wind turbine 10, such as on the tower 12. In any event, the cooler 24 is exposed to an external air flow that may be used to achieve a cooling effect.

In use, the cooling system is arranged to provide the working fluid to the heat-generating components 22 where the working fluid picks up or absorbs heat from the heat-generating components 22. One or more heat exchangers may be provided to efficiently transfer heat from the heat generating components 22 in the wind turbine 10 to the working fluid of the cooling system. The pump of the cooling system then directs the heated working fluid to the cooler 24. As noted above, the cooler 24 is typically positioned external to the nacelle 14 behind the rotor 16 and is subject to an air flow through the cooler 24. The passage of the air through the cooler 24 causes the heat in the working fluid to transfer to the external air, thus cooling the working fluid. The now cooled working fluid is then directed back to the heat-generating components 22 in the nacelle 14 under the direction of the pump and the cycle is repeated. The cooling system essentially transfers heat from the heat-generating components 22 and immediate environment (e.g., inside the nacelle 14) to the external environment in order to maintain the operating temperature of the wind turbine components at a suitable level that provides efficient operation of the wind turbine 10.

Figure 2A:
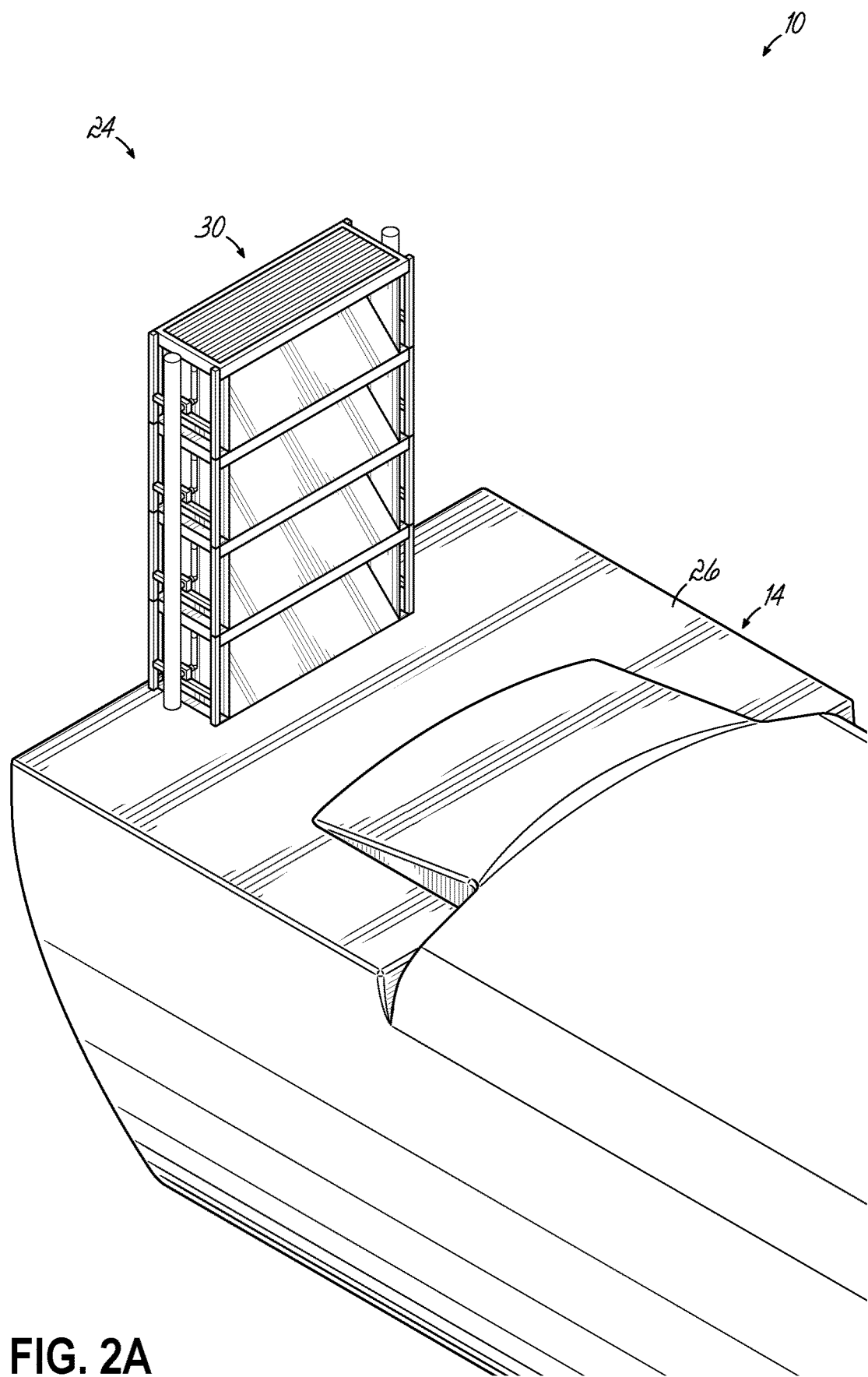
FIG. 2A is an enlarged partial perspective view of the wind turbine of FIG. 1 with a one-module cooler in accordance with an embodiment of the invention.
Figure 2B:
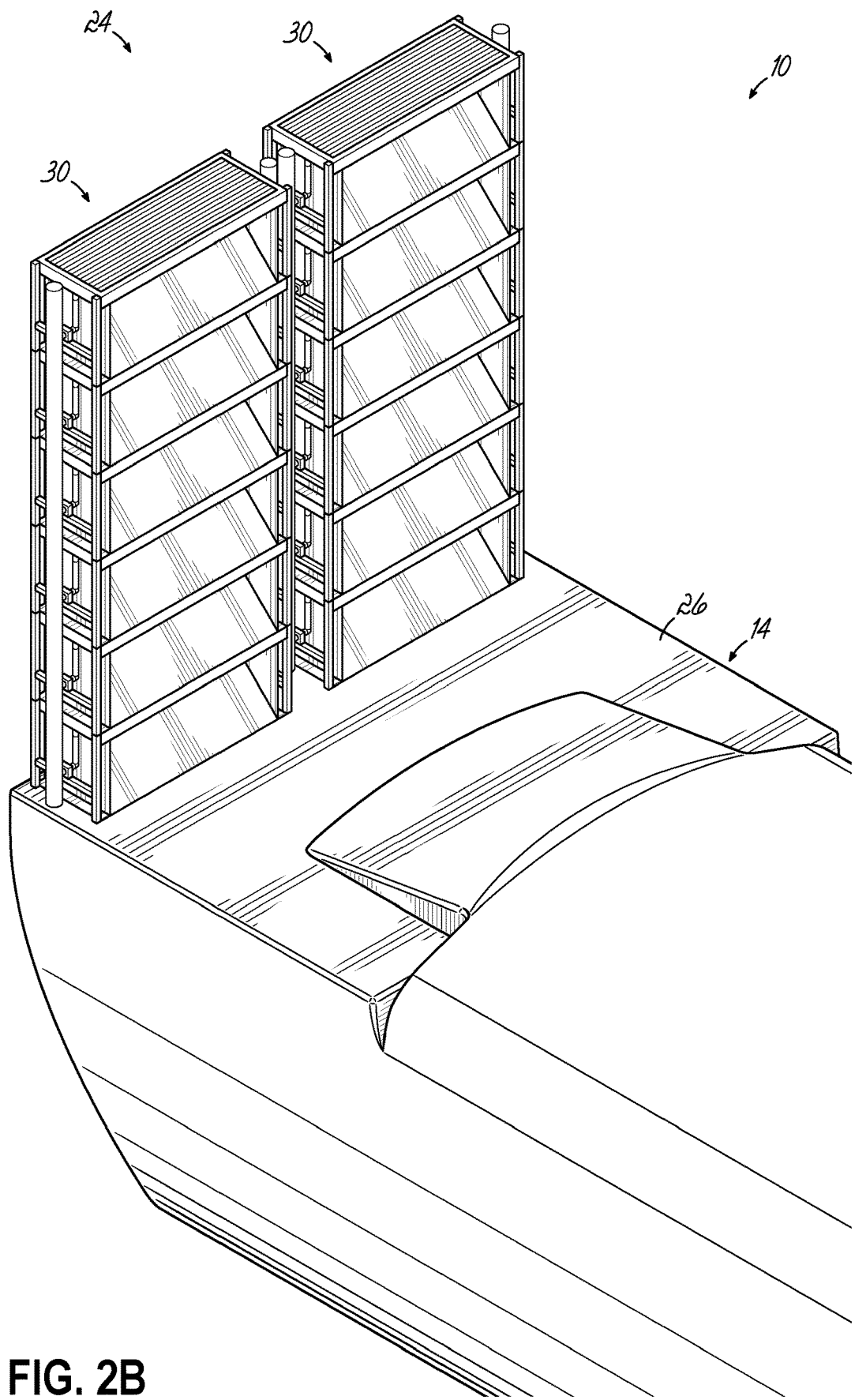
FIG. 2B is an enlarged partial perspective view of the wind turbine of FIG. 1 with a two-module cooler that is taller than the two-module cooler in FIG. 2.

With reference to FIG. 2, the cooler 24 has two cooling modules 30 located next to each other on the roof 26 of the nacelle 14 with the cooling modules 30 extending across the width of the nacelle 14. In other words, the two cooling modules 30 are arranged adjacent to each other in a direction substantially perpendicular to the longitudinal axis LA of the nacelle 14, i.e., arranged horizontally adjacent to each other. The two cooling modules 30 are largely the same in their construction and both are coupled to the cooling system of the wind turbine 10. Advantageously, if less cooling capacity is needed for a particular wind turbine, a single cooling module may be located on the roof 26 of the nacelle 14 as illustrated in FIG. 2A. Similarly, if additional cooling capacity is needed for a particular wind turbine, the height of each cooling module 30 may be increased to include additional heat exchangers as illustrated in FIG. 2B. As shown in FIG. 2B, additional cooling units 32 are arranged adjacent to each other in a direction perpendicular to the longitudinal axis LA of the nacelle 14. More specifically, FIG. 2B shows that the cooling units 32 are vertically stacked. As shown in FIG. 2 and for purposes of this description, the cooling module has a width W, a length L, and a height H. The width W of the cooling module 30 extends generally in the same direction as the width of the nacelle 14, i.e., side to side, and the length of the cooling module 30 extends generally in the same direction as the length of the nacelle 14, i.e., front to back. The height H of the cooling module 30 extends generally in the same direction as the height of the nacelle 14, i.e., bottom to top.

Figure 3:
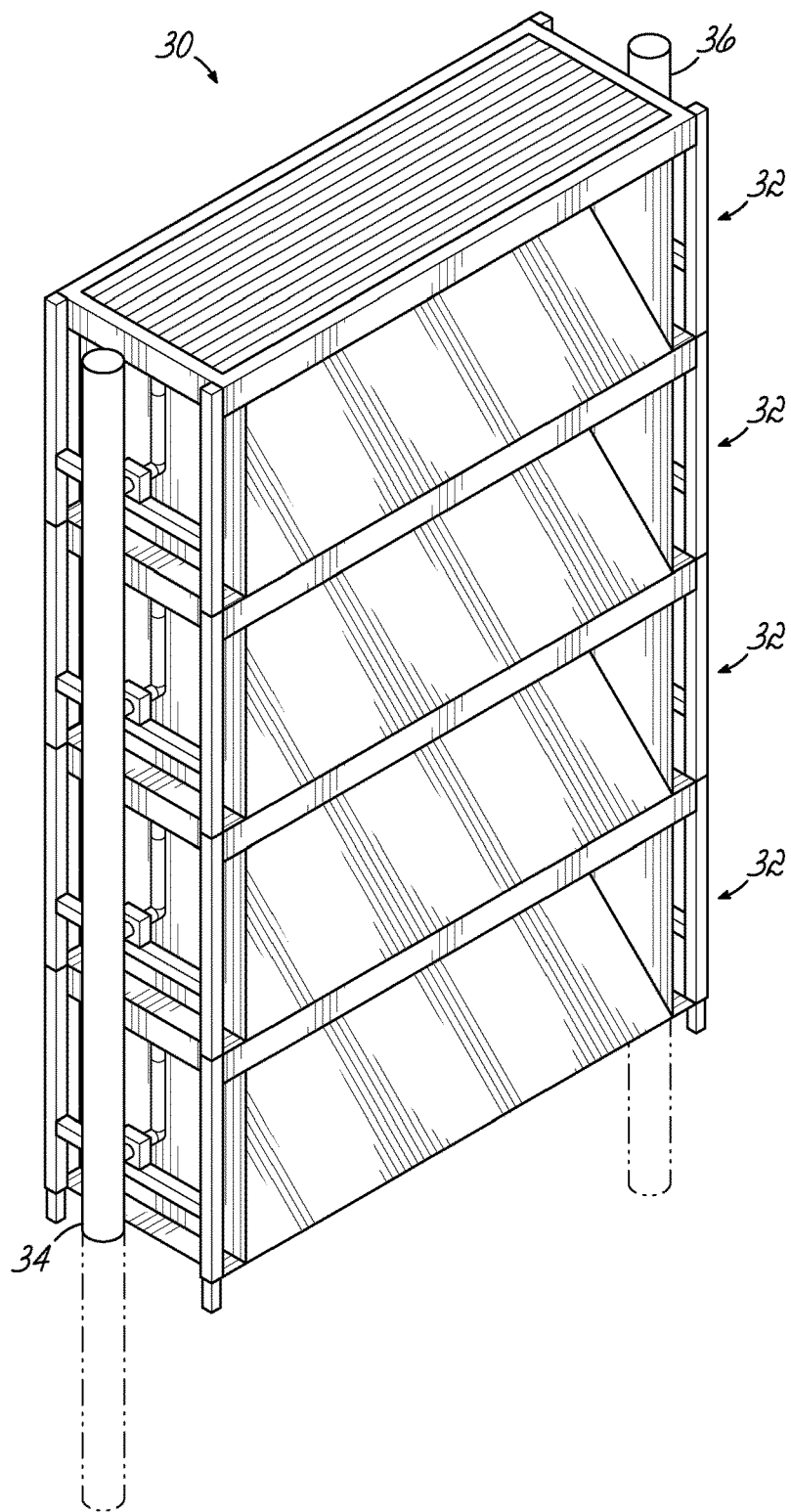
FIG. 3 is a perspective view of a one-module cooler in accordance with an embodiment of the invention.
Figure 4:
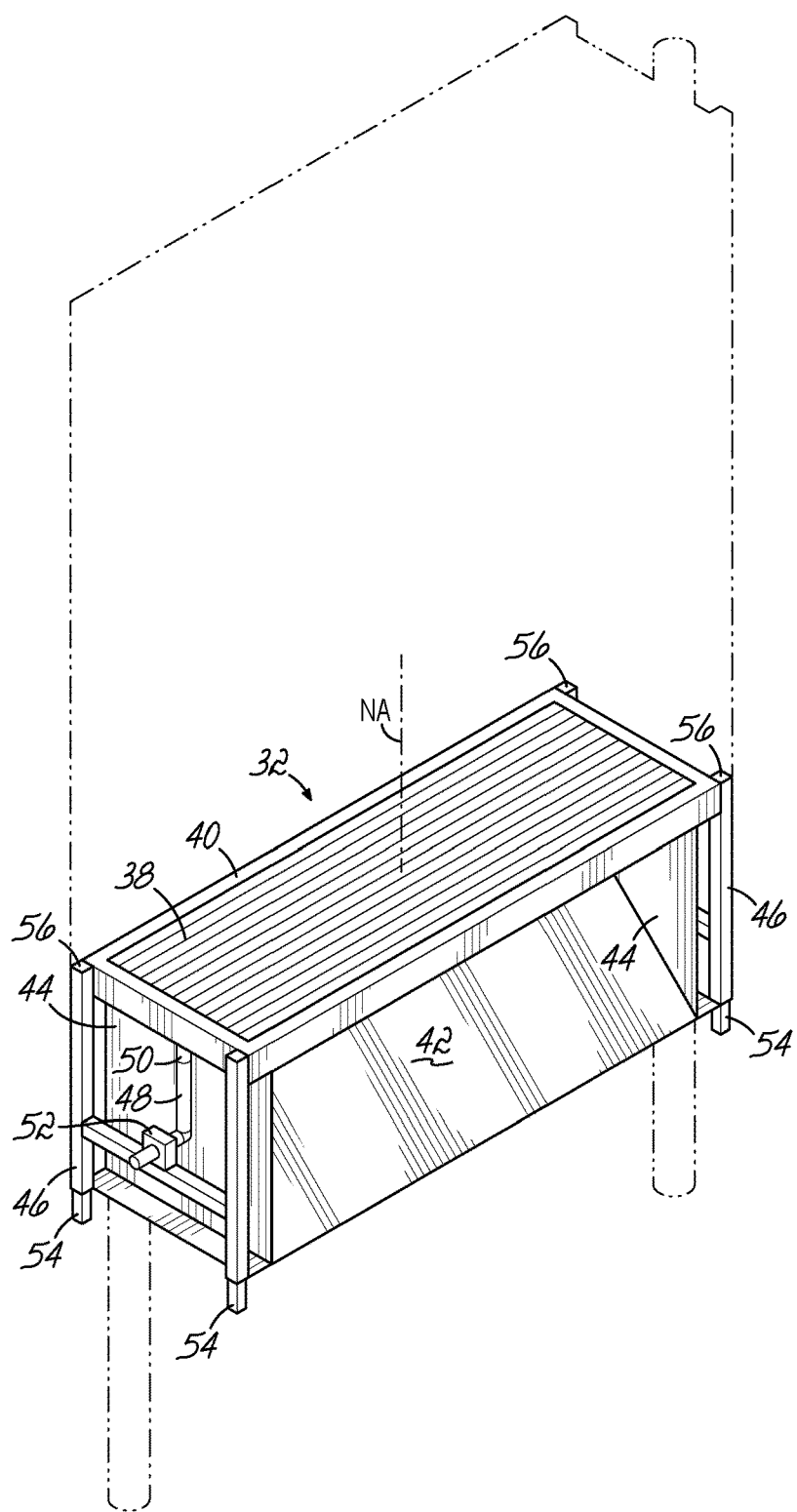
FIG. 4 is a single cooling unit of the one-module cooler of FIG. 3.
Figure 5:
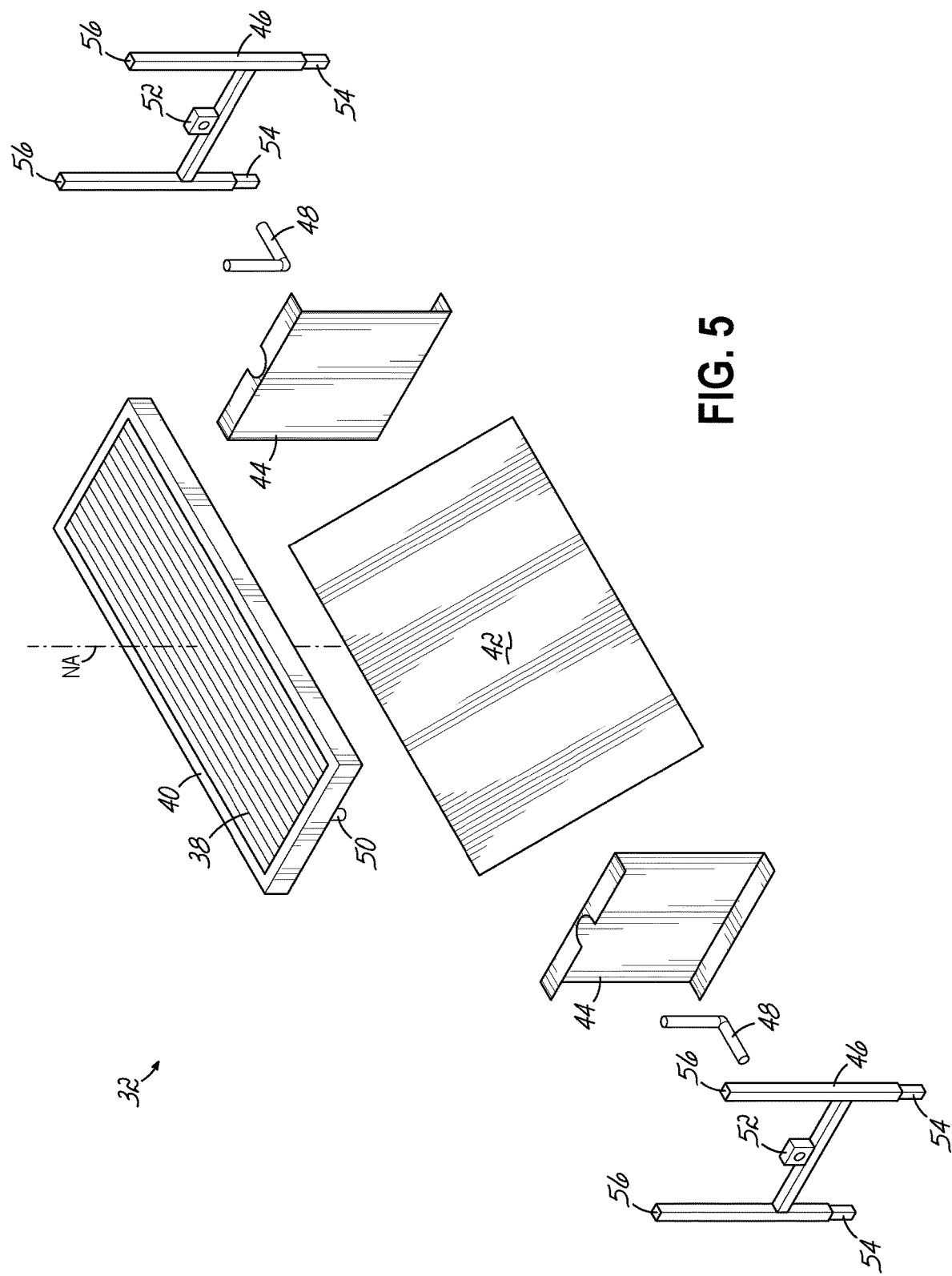
FIG. 5 is a disassembled perspective view of the single cooling unit of FIG. 4.

With reference to FIGS. 3-5, each cooling module 30 is comprised of at least one individual cooling unit 32 and preferably a plurality of individual cooling units 32. The cooling module 30 in FIG. 3 is comprised of four individual cooling units 32 that are stacked vertically one on top of the other. As will be discussed below, the number of individual cooling units 32 used in each cooling module 30 may be dictated by the cooling capacity needed for a particular wind turbine. Heated working fluid enters the individual cooling units 32 via an inlet liquid manifold 34 and the cooled working fluid exits the individual cooling units 32 via and outlet liquid manifold 36.

FIG. 5 is a disassembled view of the individual cooling unit 32 showing the main components of the individual cooling unit 32. Specifically, the individual cooling unit 32 includes a heat exchanger 40 with a cooling area 38, a deflector plate 42, side walls 44, support frames 46, and fluid conduits 48. The cooling area 38 defines a normal axis NA that is substantially perpendicular to the cooling area 38. As used herein, the term "substantially perpendicular" means 90±5 degrees and more preferably 90±1 degree. The fluid conduits 48 may be operatively coupled to opposing ends of the heat exchanger at ports 50. Each support frames 46 includes a fluid conduit support 52 for supporting one of the fluid conduits 48. Each heat exchanger 40 is oriented substantially horizontally in the individual cooling unit 32 in the cooling module 30 such that the normal axis NA is substantially perpendicular to the longitudinal axis LA of the nacelle 14 (e.g., see FIGS. 2-2B).

This horizontal orientation of the heat exchangers 40 is different from the vertical orientation of heat exchangers in traditional coolers mounted on the roof of a wind turbine where the cooling area of those heat exchangers directly faces the incoming wind. Because of the horizontal orientation of the heat exchangers 40, the cooling area 38 does not directly face the incoming wind. For the cooling modules 30 in FIGS. 2-4, the cooling area 38 is substantially perpendicular to the incoming wind. Instead, the deflector plate 42 may be positioned relative to the heat exchange 40 to direct the incoming wind upwardly into the cooling area of the heat exchanger 40 by diverting the flow of the incoming wind by an angle θ that is less than 180° relative to the longitudinal direction (X). That is, the deflector plate 42 may be tilted upwardly to deflect the incoming air into the bottom of the heat exchanger 40. Alternatively, the deflector plate 42 may be tilted downwardly to deflect the incoming air into the top of the heat exchanger 40. In any event, the deflector plate 42 defines a plane that may be non-parallel to the longitudinal axis LA of the nacelle 14. The cooling unit 32 is oriented such that the normal axis NA of the heat exchanger is non-parallel to the longitudinal axis LA of the nacelle 14.

The support frames 46 are configured to be stacked so that individual cooling units 32 may be arranged one on top of the other. To that end, each support frame 46 includes an insertion end 54 at the bottom of the support frame 46 that is dimensioned to be slid into a receiver end 56 at the top of the support frame 46. Thus, when an additional individual cooling unit 32 is to be stacked on top of an existing individual cooling unit 32, the insertion ends 54 on the additional individual cooling unit 32 are slid into the receiver ends 56 on the existing individual cooling unit 32. Accordingly, in one aspect of the invention, the cooler 24 has a modular design with one or more cooling modules 30 and each module 30 including one or more cooling units 32. The cooling modules 30 are designed to have additional cooling units 32 incorporated into the cooling modules 30 in a relatively straight-forward manner in order to increase the cooling capacity of the cooler 24.

Figure 6:
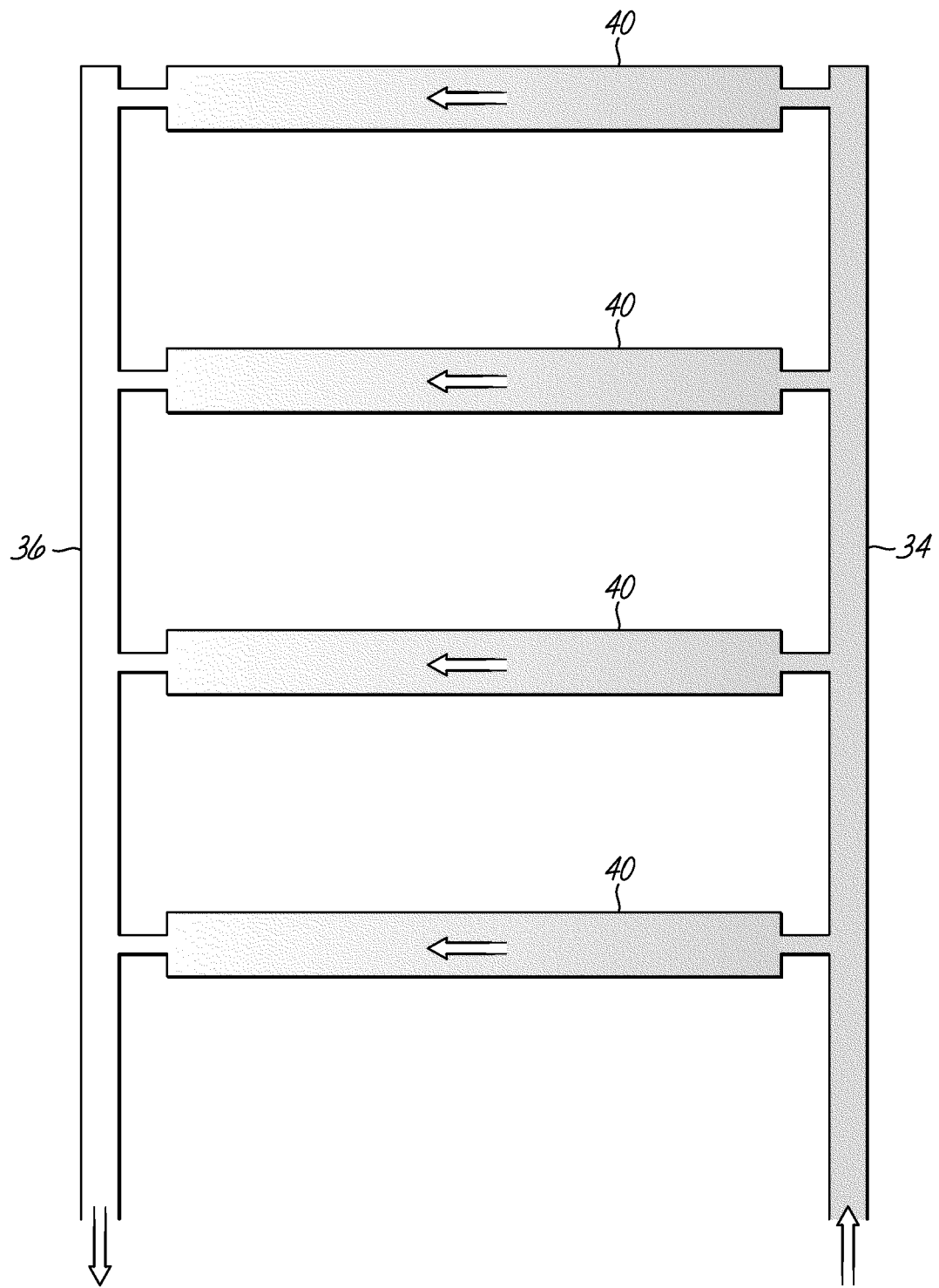
FIG. 6 is a diagrammatic illustration of a flow path of heated fluid through the heat exchangers in the cooler in FIG. 3.
Figure 6A:
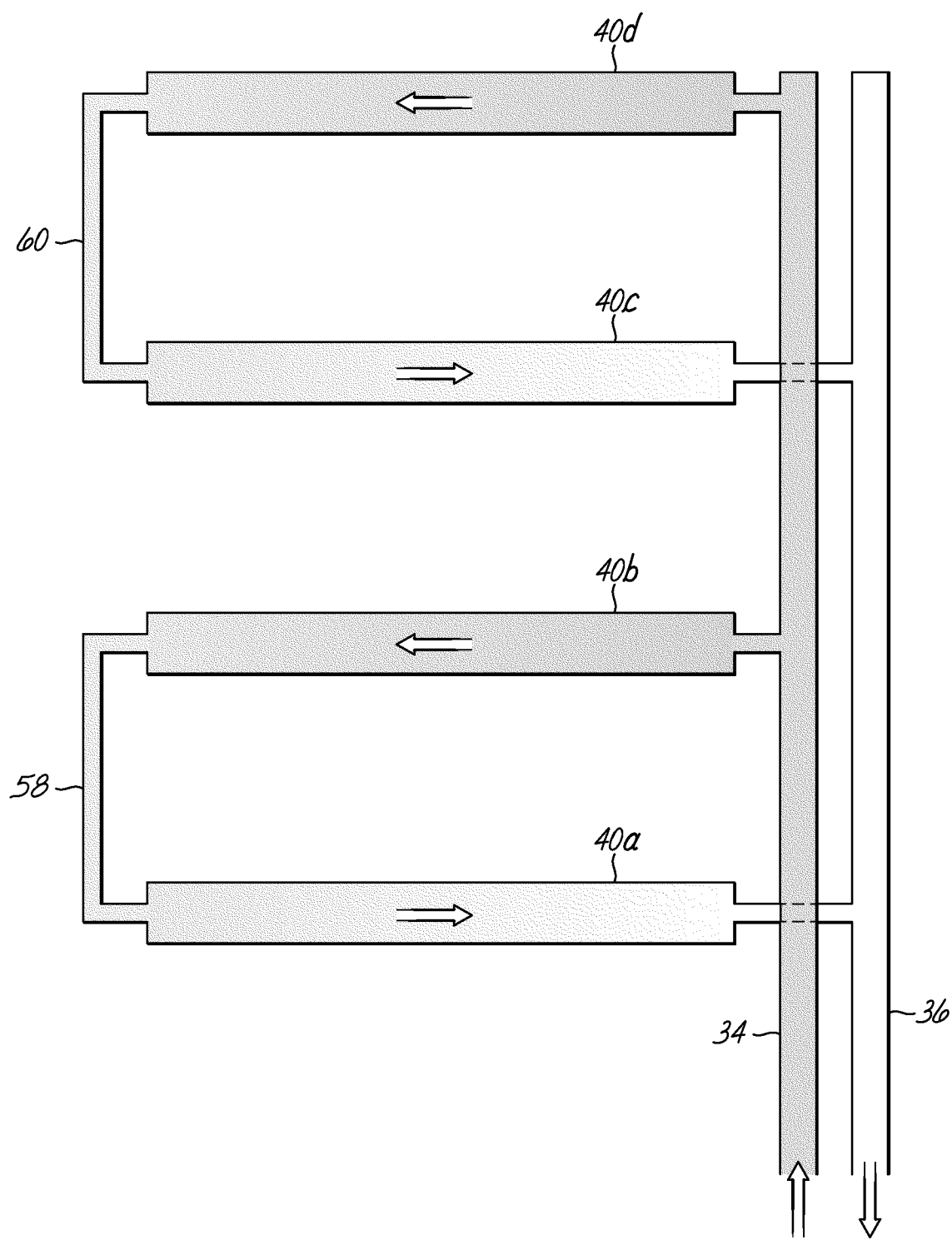
FIG. 6A is a diagrammatic illustration of another flow path of heated fluid through the heat exchangers in the cooler in FIG. 3.
Figure 6B:
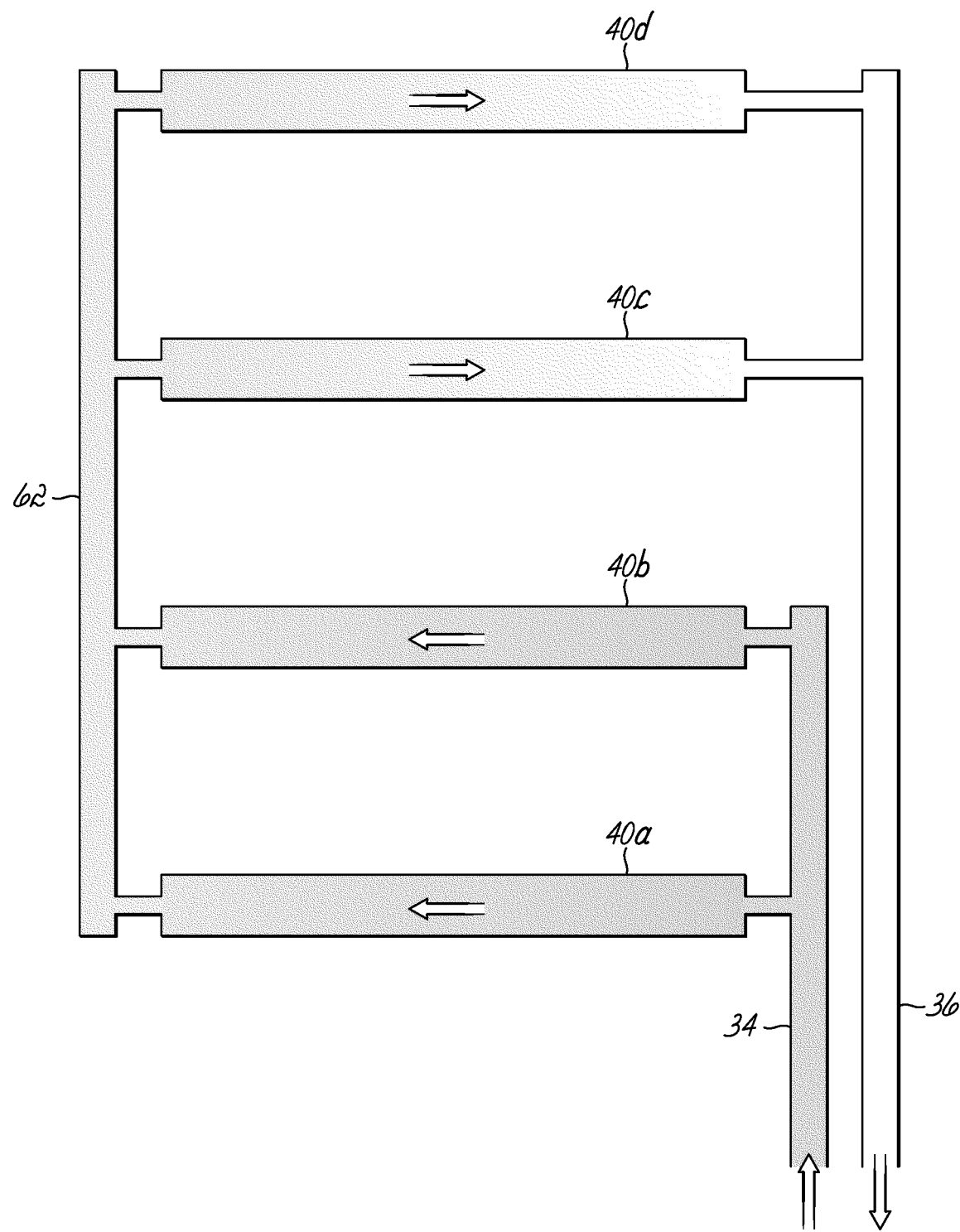
FIG. 6B is a diagrammatic illustration of yet another flow path of heated fluid through the heat exchangers in the cooler in FIG. 3.

FIGS. 6, 6A, and 6B schematically illustrate different flow paths for the working fluid to enter and exit the cooling module 30 with four individual cooling units 32. In FIG. 6, the working fluid flows upward through the inlet liquid manifold 34, into and through each of the four heat exchangers 40 in the respective individual cooling units 32, and flows downward through outlet liquid manifold 36. The flow path illustrated in FIG. 6 correspondence to the flow path of the cooling module 30 in FIG. 3 where the inlet liquid manifold 34 and the outlet liquid manifold 36 are located at opposing sides of the cooling module 30. This arrangement may be referred to as a single pass system because the working fluid flows through each heat exchanger 40 only one time.

FIG. 6A illustrates an alternate flow path through the cooling module 30 with four individual cooling units 32. For the purpose of explaining FIG. 6A, the bottom most heat exchanger 40 in the bottom most individual cooling unit 32 will be referred to as heat exchanger one 40a and each subsequently higher heat exchanger will be referred to as heat exchanger two 40b, three 40c, and four 40d. In this embodiment, both the inlet liquid manifold 34 and the outlet liquid manifold 36 are located on the same side of the cooling module 30, which may provide a more compact cooling module 30 compared to the cooling module 30 in FIG. 3. The working fluid flows upward through the inlet liquid manifold 34, into heat exchanger two 40b and heat exchanger four 40d. The working fluid flows out of heat exchanger two 40b, through a connecting conduit 58, into heat exchanger one 40a, and flows downward through outlet liquid manifold 36. Similarly, the working fluid flows out of heat exchanger four 40d, through a connecting conduit 60, into heat exchanger three 40c, and flows downward through outlet liquid manifold 36. This arrangement may be referred to as a dual pass system because the working fluid flows through two heat exchanger pairs, e.g., 40c, 40d, before the working fluid flows out through the outlet liquid manifold 36.

FIG. 6B illustrates yet another alternate flow path through the cooling module 30 with four cooling units 32. The naming convention of the heat exchangers 40a-40d in FIG.

6B will follow that used for the heat exchangers 40a-40d in FIG. 6A. In this embodiment, both the inlet liquid manifold 34 and the outlet liquid manifold 36 are located on the same side of the cooling module 30, like in FIG. 6A. The working fluid flows upward through the inlet liquid manifold 34, into heat exchangers one and two 40a, 40b, into a connecting manifold 62, into and through heat exchangers three and four 40c, 40d, and then flows downward through outlet liquid manifold 36. Like FIG. 6A, this arrangement may be referred to as a dual pass system as the working fluid flows through at least two heat exchangers 40a-40d before the working fluid flows out through the outlet liquid manifold 36. While FIGS. 6-6B illustrate various exemplary flow paths of the working fluid through the cooling module 30, it should be recognized that there may be other flow path arrangements through the cooling module 30 that sufficiently cool the working fluid. Thus, aspects of the invention should not be limited to any particular flow path arrangement through the cooling module 30.

Other working fluid flow paths through the heat exchangers 40a-40d may be implemented to optimize the efficiency of the cooler 24. One consideration to improve efficiency is to connect the heat exchanger that experiences the highest air flow therethrough (likely the highest heat exchanger (40d) in the cooling module 30) with the heat exchanger that experiences the lowest air flow therethrough (likely the lowest heat exchanger (40a) in the cooling module). For example, this suggests connecting heat exchangers 40d and 40a and connecting heat exchangers 40c and 40b. This would be another dual pass configuration. Other flow paths, such as parallel flow, counter flow, and cross flow, may also be used to optimize heat transfer.

Figure 7:
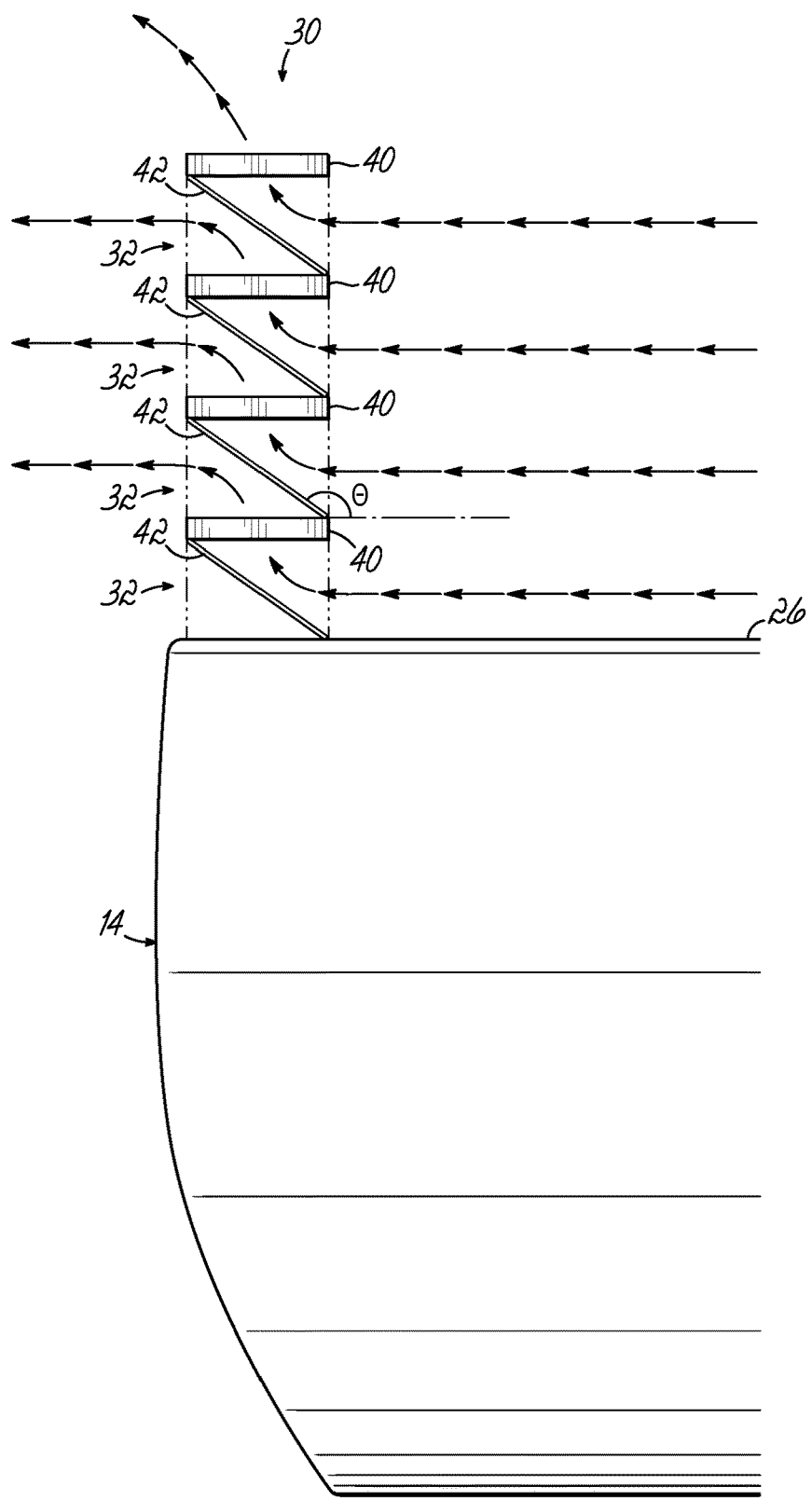
FIG. 7 is a side view of the wind turbine of FIG. 2 with the air path through the cooler diagrammatically illustrated.

FIG. 7 schematically illustrates the air flowing through the heat exchangers 40 of the cooling module 30. Only the heat exchangers 40 and the deflector plates 42 are illustrated to provide a clear view of air flow path. As shown, the deflector plates 42 help deflect/direct the incoming wind upwards and into the bottom side of the heat exchangers 40 and out the top side of the heat exchangers 40. The deflector plate 42 above the heat exchanger 40 helps to deflect/direct the wind rearward and out of the cooling module 30. The upper most heat exchanger 40 does not have a deflector plate 42 above it so the air through that heat exchanger 40 departs with a more vertical velocity component compared to the air flow from the other heat exchangers 40.

As noted above, the cooling modules 30 are made up of individual cooling units 32. To alter the cooling capacity of a cooling module 30, the number of individual cooling units 32 can be decreased or increased. For example, each of the cooling modules in FIG. 2 have four individual cooling units 32. To increase the cooling capacity of those cooling modules 30, two additional individual cooling units 32, for example, may be added as shown in FIG. 2B. As such the height of the cooling modules 30 has increased. Thus, the cooling modules 30 are scalable in the height direction to increase the cooling capacity of the cooler 24.

Figure 8C:
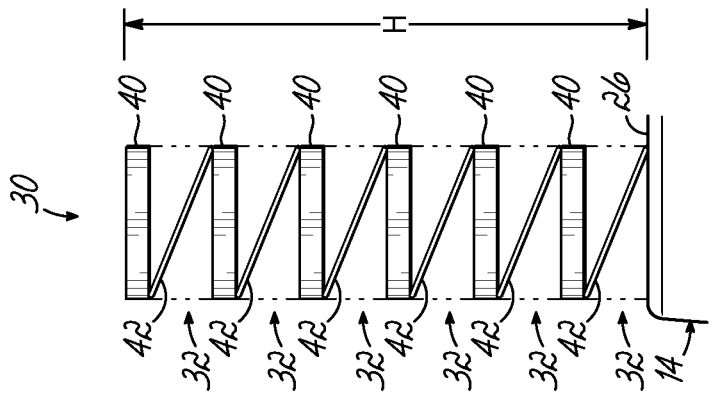
FIG. 8C is a schematic side view of a cooling module with six heat exchangers positioned on a nacelle of a wind turbine.
Figure 8B:
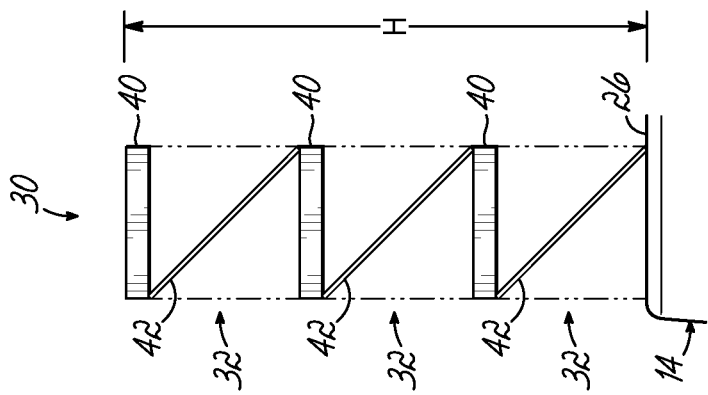
FIG. 8B is a schematic side view of a cooling module with three heat exchangers positioned on a nacelle of a wind turbine.
Figure 8A:
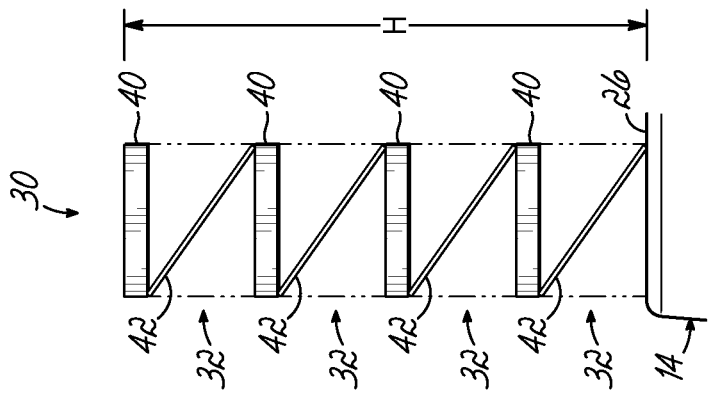
FIG. 8A is a schematic side view of a cooling module with four heat exchangers positioned on a nacelle of a wind turbine.

Another approach to scaling in the height direction is to keep the overall height of the cooling module 30 the same but add or remove individual cooling units 32 from the cooling module 30. For example, FIG. 8A illustrates the cooling module 30 with the height H shown in FIG. 7 with four individual cooling units 32 equally spaced apart along the height H. FIG. 8B, however, illustrates the cooling module 30 with the same height H with only three individual cooling units 32, also equally spaced apart along the height H. The individual cooling units 32 are spaced farther apart in FIG. 8B compared to the spacing of the individual cooling units 32 in FIG. 8A. To accommodate the greater spacing of the individual cooling units 32 in FIG. 8B, the deflector plate 42 is longer and inclined greater to the horizon than the deflector plate 42 in FIG. 8A. FIG. 8C illustrates the cooling module 30 with the height H and with six individual cooling units 32 equally spaced apart along the height H. The individual cooling units 32 are spaced closer together than the individual cooling units 32 in FIGS. 8A and 8B. To accommodate that closer spacing, the deflector plate 42 is shorter and inclined less to the horizon than the deflector plate 42 in FIGS. 8A and 8B.

In addition, the overall cooling capacity of the wind turbine's cooling system may increase or decrease by adding or removing cooling modules across the width of the nacelle 14. In FIG. 2, for example, two cooling modules 30 are aligned across the width of the nacelle 14. In FIG. 2A, however, only one cooling module 30 is present, so the cooling capacity for the wind turbine is reduced compared to the arrangement in FIG. 2. Thus, the cooling modules 30 are scalable in the width direction to increase the cooling capacity of the cooler 24.

Figure 9C:
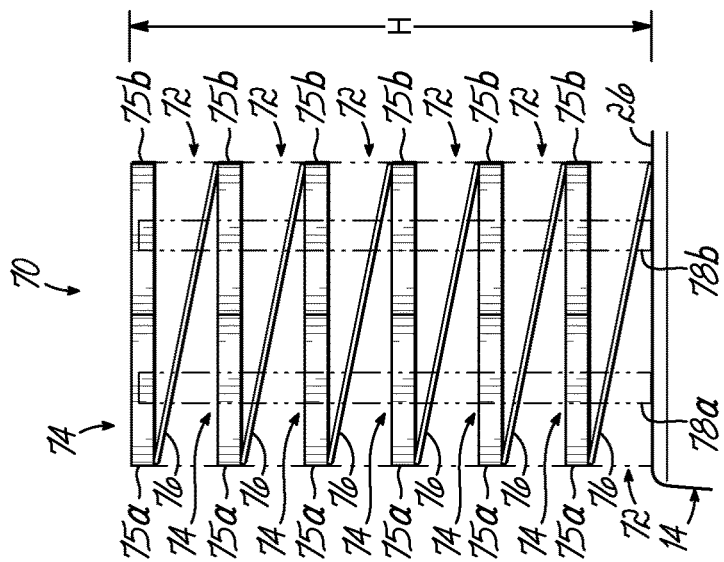
FIG. 9C is a schematic side view of a cooling module with twelve heat exchangers in four rows, with two heat exchangers in each row.
Figure 9B:
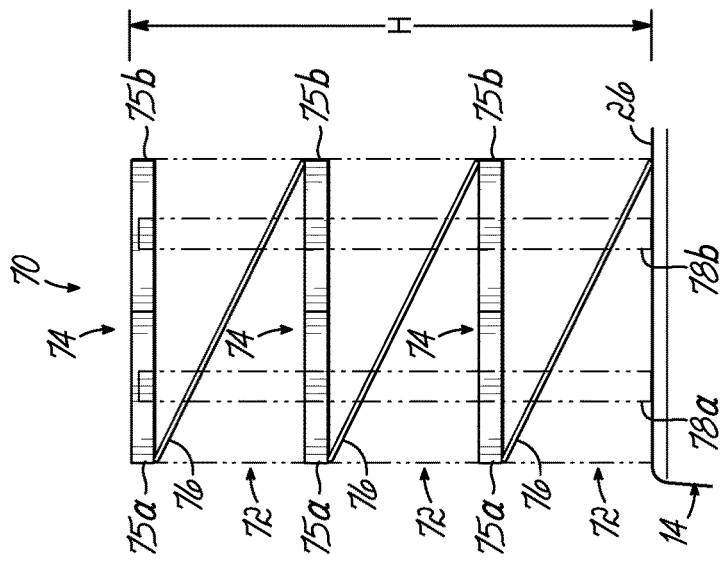
FIG. 9B is a schematic side view of a cooling module with six heat exchangers in four rows, with two heat exchangers in each row.
Figure 9A:
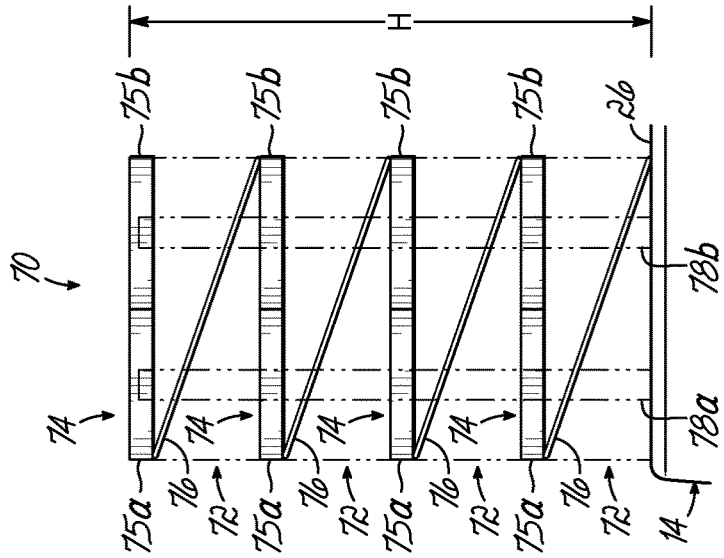
FIG. 9A is a schematic side view of a cooling module with eight heat exchangers in four rows, with two heat exchangers in each row.

A second embodiment of a cooling module 70 is illustrated in FIG. 9A. The cooling module 70 is similar to the cooling module 30 describe above, but with some differences. For example, in the description above the individual cooling unit 32, which makes up the cooling module 30, has a single heat exchanger 40 and when the individual cooling units 32 are stacked on top of each other, they form a single, vertical column of heat exchangers 40, see, e.g., FIGS. 7 and 8A. In contrast, the cooling module 70 has one or more individual cooling units 72 with each cooling unit 72 having one heat exchanger 74, but that heat exchanger 74 has two heat transfer panels 75a, 75b arranged adjacent to each other in a direction substantially parallel to the longitudinal axis LA of the nacelle 14 (e.g., substantially parallel to the incoming wind). As used herein, the term "substantially parallel" means 0±5 degrees and more preferably 0±1 degree. When the individual cooling units 72 are stacked on top of each other, they form two, vertical columns of heat transfer panels 75a, 75b. Thus, cooling module 30 (FIGS. 7 and 8A) may be considered a single-column configuration whereas the cooling module 70 (FIG. 9A) may be considered a dual-column configuration. While the individual cooling unit 72 includes two heat transfer panels 75a, 75b, it has a single deflector plate 76 extending from the front to the rear of the individual cooling unit 72 and is positioned relative to the heat exchanger 74 such that the incoming wind is directed to each of the heat transfer panels 75a, 75b. Finally, each heat transfer panel 75a, 75b is connected to a respective inlet liquid manifolds 78a, 78b located at one end of the cooling module 70 and respective outlet liquid manifolds (not shown) on the other end of the cooling module 70 similar to working fluid flow path used on the cooling module 30 in FIGS. 3 and 6. The inlet liquid manifolds 78a, 78b and the outlet liquid manifolds may also be configured to match the working fluid path illustrated in FIGS. 6A and 6B, for example.

As discussed above with respect to FIGS. 8A-8C, the number of individual cooling units 72 in a cooling module 70 of a given height H may vary. The cooling module 70 in FIG. 9A has four, equally spaced apart individual cooling units 72. FIG. 9B illustrates the cooling module 70 with the same height H with only three individual cooling units 32, also equally spaced apart along the height H. The individual cooling units 72 in FIG. 9B are space farther apart compared to the individual cooling units in FIG. 9A. FIG. 9C illustrates the cooling module 70 with the height H and with six individual cooling units 72 equally spaced apart along the height H. The individual cooling units 72 are spaced closer together than the individual cooling units 72 in FIGS. 9A and 9B. Alternatively, the height of the cooling module 70 may be increased with an increasing number of cooling units 72. These figures demonstrate that the cooling modules 70 are scalable in the length direction to increase the cooling capacity of the cooler 24.

Figure 10:
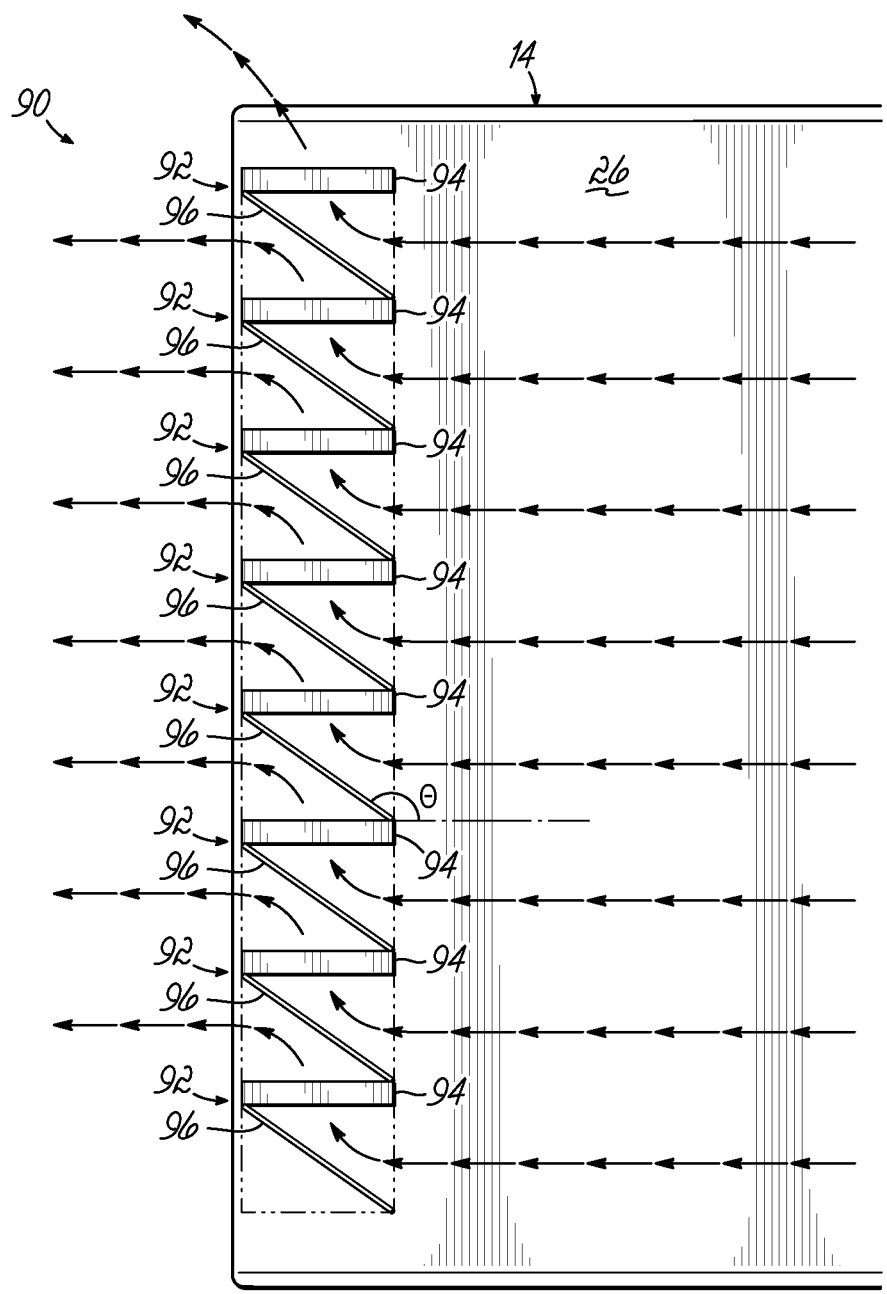
FIG. 10 is an enlarged top view of a wind turbine having a cooling module with the heat exchangers oriented vertically.

FIG. 10 is a top view illustrating another embodiment of a cooling module 90 with individual cooling units 92, each with a heat exchanger 94 and a deflector plate 96. The cooling module 90 is similar in construction to the cooling module 30 illustrated in FIGS. 2 and 3, for example. The cooling module 90 is essentially the cooling module 30 laid over on its side. As such, each heat exchanger 94 is oriented substantially vertically such that the normal axis NA of the heat exchanger 94 is substantially perpendicular to the longitudinal axis LA of the nacelle 14. Consequently, like heat exchangers 40, the cooling areas of heat exchangers 94 do not directly face the incoming wind. More specifically, the heat exchangers 94 in FIG. are oriented such that the normal axes NA of the heat exchangers 94 are substantially perpendicular to the incoming wind. To account for this, a deflector plate 96 directs the incoming wind into the heat exchangers 94, thereby moving the incoming wind laterally through the heat exchangers 94 instead of upwardly like the deflector plates 42 in cooling module 30. The deflector plates 96 of the cooling module 90 may be configured to direct the incoming wind laterally through either side of the heat exchangers 94.

Figure 10A:
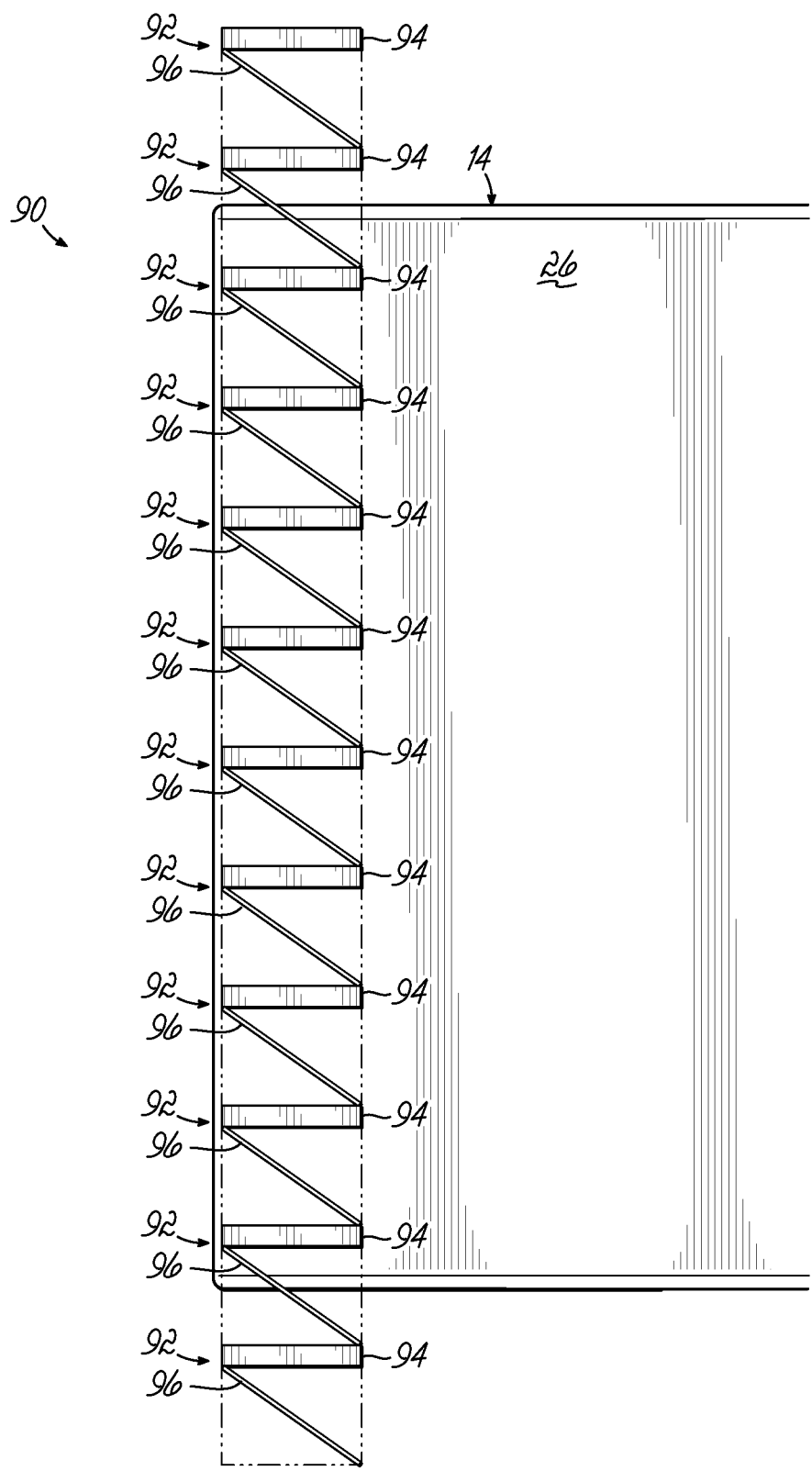
FIG. 10A is an enlarged top view of a wind turbine having a cooling module of FIG. 8, but with additional vertically oriented heat exchangers.
Figure 10B:
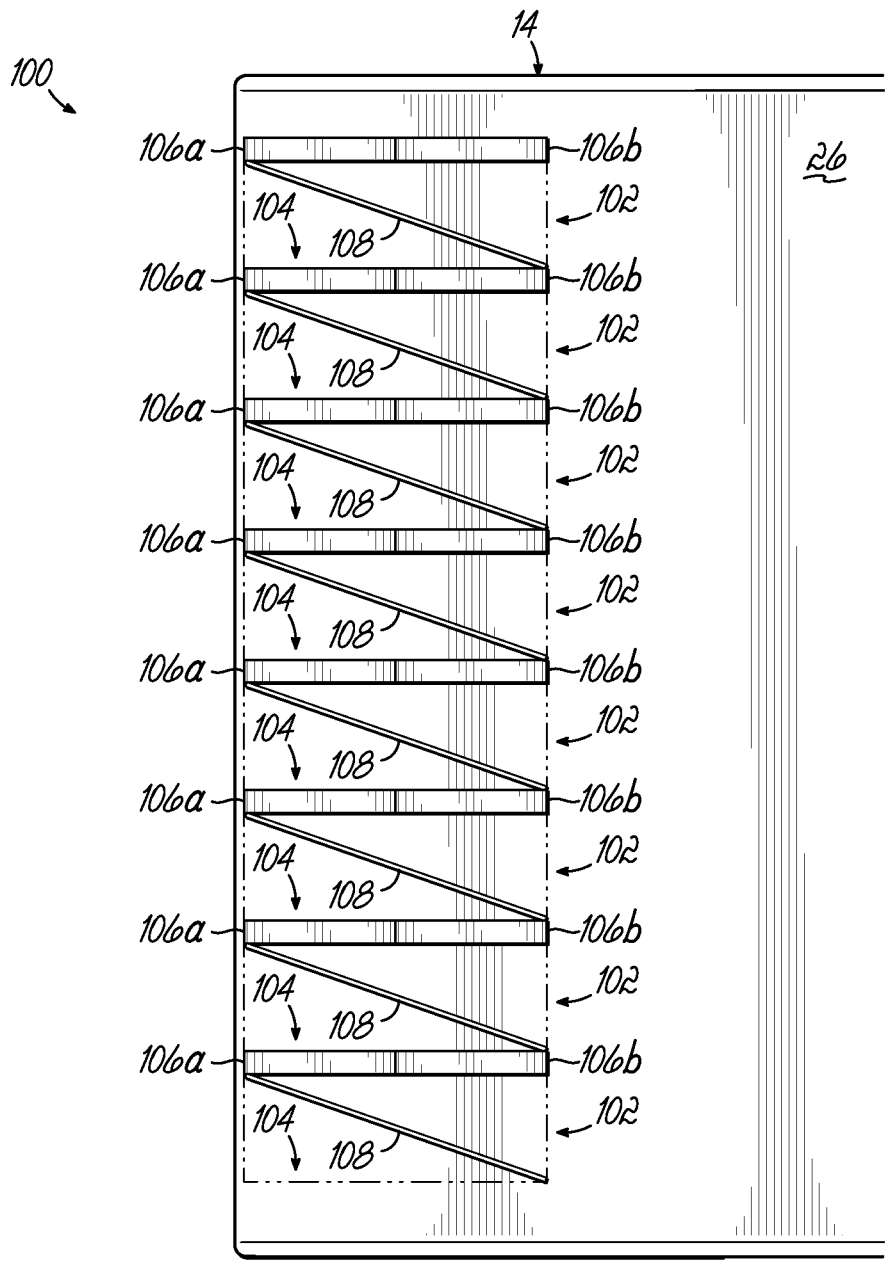
FIG. 10B is an enlarged top view of a wind turbine having a cooling module with sixteen heat exchangers in eight rows, with two heat exchangers in each row.

Like the cooling module 30, cooling module 90 may be modified to adjust its cooling capacity as required by the particular wind turbine. In one example, one cooling module 90 may be placed/stacked vertically atop the existing cooling module 90. In another example, the cooling module 90 may be made wider by adding additional individual cooling units 92 as shown in FIG. 10A. As illustrated in FIG. 10B, the cooling module 100 is a dual column configuration similar to the cooling module 70 in FIGS. 9A-9C. In FIG. 10B, the cooling module 100 includes eight cooling units 102 with each cooling unit having a heat exchanger 104 where each heat exchanger 104 has two heat transfer panels 106a, 106b in two columns. While the individual cooling units 102 include two transfer panels 106a, 106b, it has a single deflector plate 108 extending from the front to the rear of the individual cooling unit 102. Thus, with the heat exchanger 104 in a substantially vertical orientation, the cooler 24 remains scalable in multiple dimensions, i.e., the width, height, and length directions of the cooler 24.

The majority of the description above and the associated figures describe and illustrate the concept of adjusting the cooling capacity of the wind turbine by adding or subtracting one or more cooling modules 30, 70, 90, 100 or adding or subtracting cooling units 32 to a particular cooling module 30. Aspects of the invention are not so limited. In this regard, aspects of the present invention also contemplate constructing the cooler 24 out of cooling units 32 without forming multiple individual cooling modules. That is, the cooling capacity may be calculated for a particular wind turbine and individual cooling units may be installed on the nacelle 14 to provide the required cooling capacity. For example, cooling units may be installed one on top of another so as to extend vertically away from the roof of the nacelle. The cooling units may be installed side-by-side extending across the width of the nacelle. Finally, the cooling units may be installed in a direction aligned with the longitudinal axis of the nacelle. The cooling units may also be installed in two or three directions in the same installation. For example, at one wind turbine, a first plurality of cooling units may be stacked (vertical scaling) to create a first column of cooling units. Then a second column of cooling units may be positioned directly adjacent to the first column of cooling units such that the cooler extends across the width of the nacelle (horizontal scaling). In other words, the cooler 24 is scalable in three directions through arrangement (and suitable interconnections) of cooling units 32. Thus, the cooling units 32 are essentially building blocks for forming the overall cooler 24.

Figure 11A:
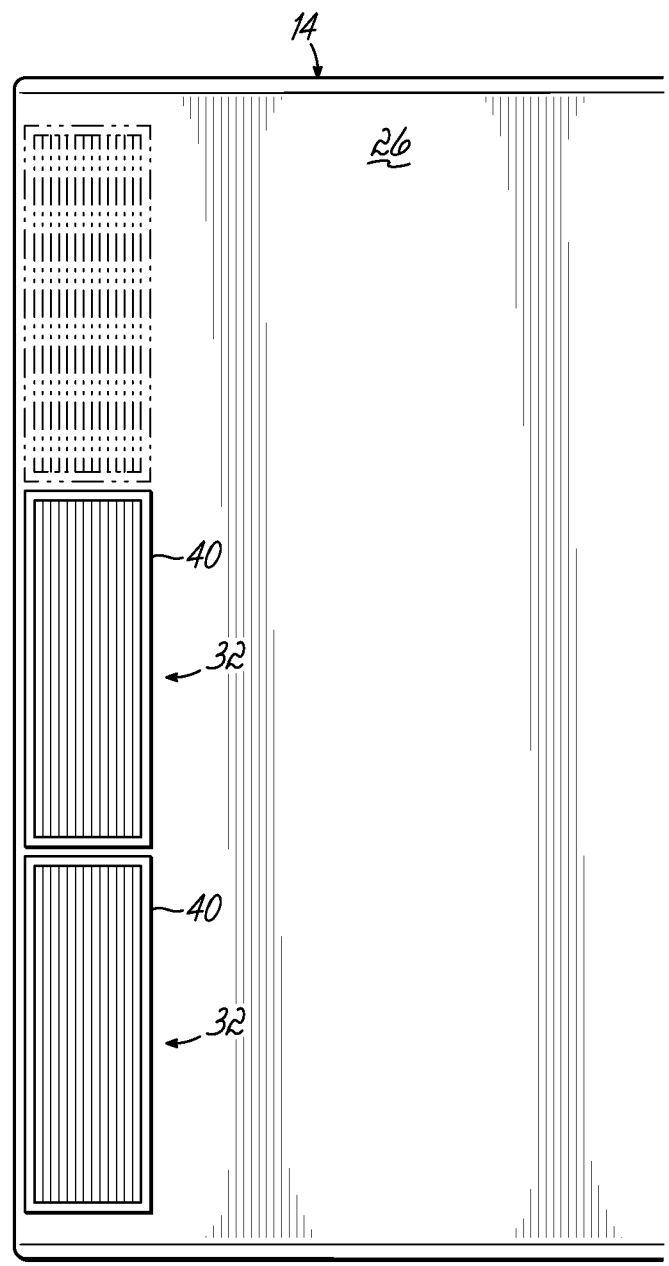
FIG. 11A is a schematic top view of a nacelle having two cooling units extending across the width of the nacelle.
Figure 11C:
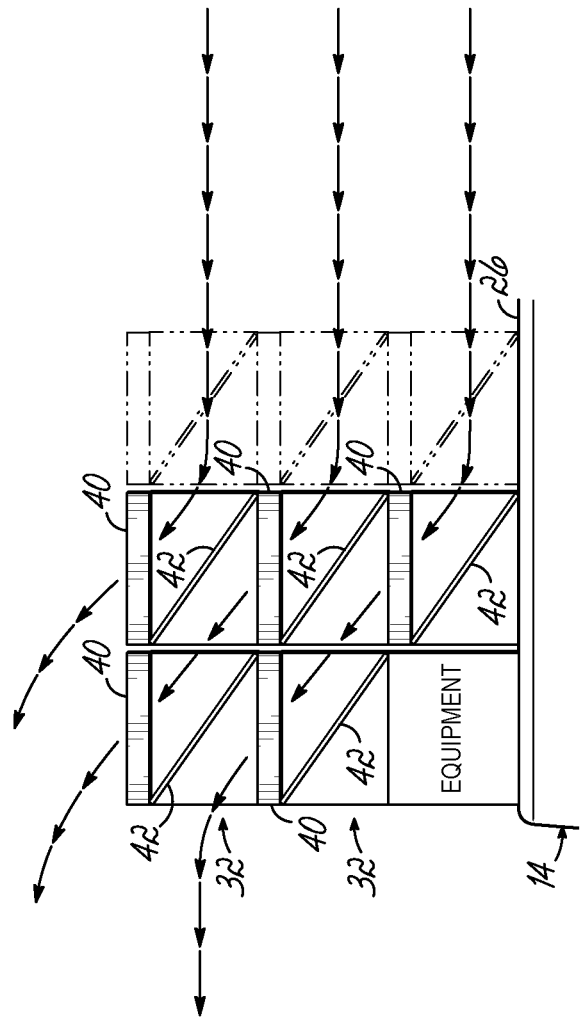
FIG. 11C is a schematic side view of a nacelle having two columns of cooling units extending in a direction aligned with the longitudinal axis of the nacelle.
Figure 11B:
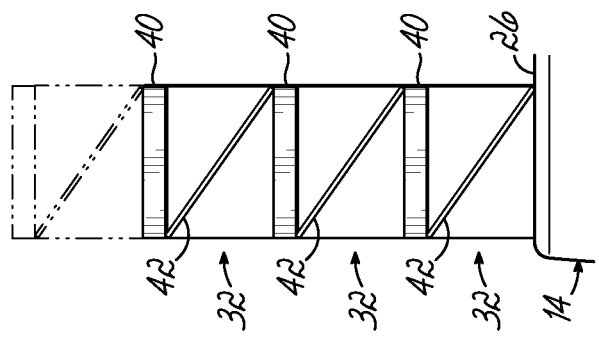
FIG. 11B is a schematic side view of a nacelle having three cooling units stacked vertically.

FIGS. 11A-11C illustrate the concept of scaling by varying the number cooling units in different directions. FIG. 11A is a plan view of the nacelle 14 with two cooling units 32 extending across the width of the nacelle 14. If additional cooling capacity is required, an additional cooling unit 32 may be added along the width of the nacelle 14. FIG. 11B is an elevational view of the nacelle 14 with three cooling units 32 stacked one on top of the other. If additional cooling capacity is required, an additional cooling unit 32 may be added atop the other three cooling units 32 in a vertical direction. Similarly, FIG. 11C is an elevation view of the nacelle 14 with two stacks of cooling units 32 extending in a direction aligned with the longitudinal axis LA of the nacelle 14. In FIG. 11C, the bottom, left most heat exchanger 40 and deflector plate 42 are absent because that heat exchanger 40 would receive little if any airflow in that position. Instead, that space may be used to place equipment, such as pumps, piping, and manifolds. Again, if additional cooling capacity is required, an additional stack of cooling units 32 may be added in front of the other two stacks of cooling units 32 so that the cooler 24 expands in a direction aligned with the longitudinal axis LA of the nacelle 13. As mentioned above, the additional cooling units 30 may be added in multiple directions. For example, the cooler 24 may be constructed from cooling units 30 arranged according to a combination of FIGS. 11A and 11B, a combination of FIGS. 11A and 11C, or any other combination, including a combination of FIGS. 11A, 11B, and 11C.

Figure 12:
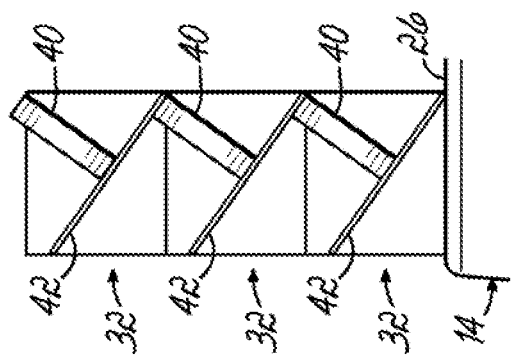
FIG. 12 is schematic side view of a nacelle with one heat exchanger oriented perpendicular to two adjacent deflector plates.

FIG. 12 illustrates the cooling module 30 with the heat exchangers 40 oriented differently from the orientation of the heat exchangers 30 discussed above. In FIG. 12, the heat exchangers 40 are positioned between and oriented perpendicular to the adjacent deflector plates 42. Such an arrangement will maximize the velocity of the air flow through the heat exchangers 30.

Figure 13:
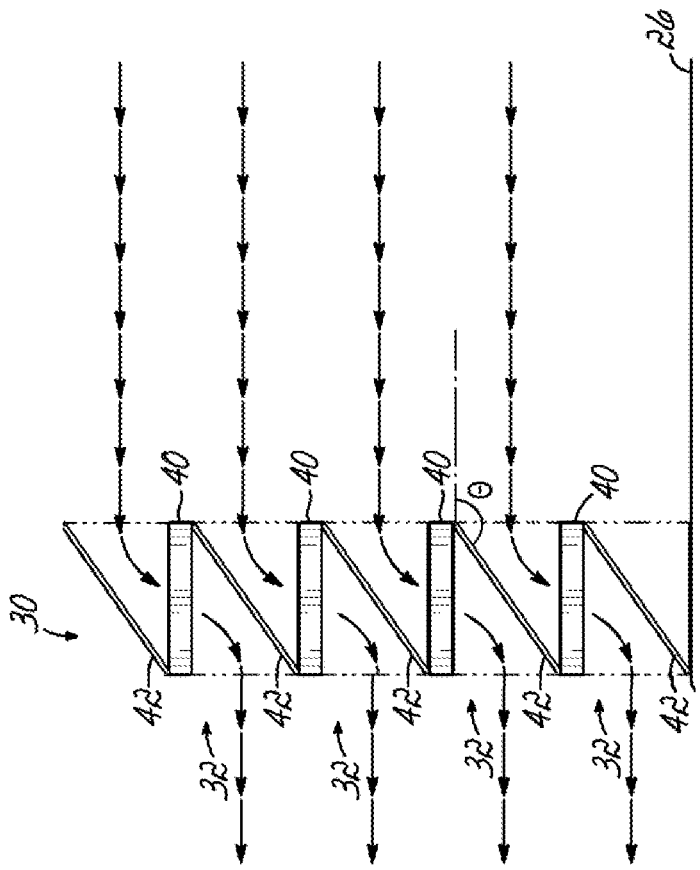
FIG. 13 is a side view of the wind turbine of FIG. 2 with another embodiment of the cooler diagrammatically illustrated.

FIG. 13 schematically illustrates another embodiment of the cooler with the air flowing through the heat exchangers 40 of the cooling module 30. Only the heat exchangers and the deflector plates 42 are illustrated to provide a clear view of air flow path. As shown, the deflector plates 42 help deflect/direct the incoming wind downwards and into the top side of the heat exchangers 40 and out the bottom side of the heat exchangers 40. The deflector plate 42 below the heat exchanger 40 helps to deflect/direct the wind rearward and out of the cooling module 30. The uppermost cooling unit 32 have a deflector plate 42 above it to capture air above the uppermost heat exchanger 40 and direct it downwards into the top of the heat exchanger 40 in the uppermost cooling unit. The space below the lowermost heat exchanger 40 is occupied by a deflector plate 42. The space in front of the lowermost deflector plate 42 in the lowermost cooling unit 32 may be utilized for equipment, piping, manifolds, valves, or other relevant equipment (not shown).

Due to the shape of the nacelle at the rear, there may be an area of lower pressure immediately behind the nacelle. This will have a positive effect on the air flow through the cooling module 30, as this will keep up the velocity of the air through the heat exchanger 40 and thereby the volume of air flowing through. Thereby the cooling capacity may increase. This will especially affect the lower cooling units 32 closer to the nacelle 26

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A wind turbine, comprising:
a tower;
a nacelle rotatably coupled to the tower and having a longitudinal axis (LA) configured to be aligned with the direction of the flow of the incoming wind during operation of the wind turbine, wherein when so aligned, the nacelle defines a longitudinal direction (X), a traverse direction (Y), and a vertical direction (Z);
one or more heat-generating components housed in the wind turbine; and
a modular cooler affixed to the nacelle and operatively coupled to the one or more heat-generating components for cooling the heat-generating components, the modular cooler comprising one or more cooling modules, each cooling module including one or more cooling units, each cooling unit further comprising:
a heat exchanger defining a cooling area, the cooling area defining a normal axis (NA); and
a deflector plate configured to be initially engaged by the incoming wind, thereby diverting the flow of the incoming wind so as to be directed through the heat exchanger,
wherein the deflector plate is positioned to define an angle between the deflector plate and the longitudinal axis (X) upstream of the deflector plate that is less than 180°, and
wherein each of the one or more cooling units of the modular cooler is oriented such that the normal axis (NA) of the heat exchanger is non-parallel to the longitudinal axis (LA) of the nacelle.

2. The wind turbine of claim 1, wherein the one or more cooling modules includes a plurality of cooling units arranged adjacent each other along at least one of the longitudinal direction (X), traverse direction (Y), and vertical direction (Z).

3. The wind turbine of claim 1, wherein the modular cooler includes a plurality of cooling modules arranged adjacent each other along at least one of the longitudinal direction (X), traverse direction (Y), and vertical direction (Z).

4. The wind turbine of claim 1, wherein the heat exchanger includes one or more heat transfer panels.

5. The wind turbine of claim 4, wherein the heat exchanger includes a plurality of heat transfer panels arranged adjacent each other in the longitudinal direction (X) of the nacelle, and wherein the deflector plate is positioned relative to the heat exchanger such that the incoming wind is directed to each of the plurality of heat transfer panels.

6. A wind turbine, comprising:
a tower;
a nacelle rotatably coupled to the tower and having a longitudinal axis (LA) configured to be aligned with the direction of the flow of the incoming wind during operation of the wind turbine, wherein when so aligned, the nacelle defines a longitudinal direction (X), a traverse direction (Y), and a vertical direction (Z);
one or more heat-generating components housed in the wind turbine; and
a modular cooler affixed to the nacelle and operatively coupled to the one or more heat-generating components for cooling the heat-generating components, the modular cooler comprising one or more cooling modules, each cooling module including one or more cooling units, each cooling unit further comprising:
a heat exchanger defining a cooling area, the cooling area defining a normal axis (NA); and
a deflector plate to direct the incoming wind through the heat exchanger by diverting the flow of the incoming wind by an angle that is less than 180° relative to the longitudinal direction (X),
wherein each of the one or more cooling units of the modular cooler is oriented such that the normal axis (NA) of the heat exchanger is non-parallel to the longitudinal axis (LA) of the nacelle, and
wherein the heat exchanger is oriented such that the normal axis (NA) is substantially parallel to the vertical direction (Z).

7. The wind turbine of claim 1, wherein the heat exchanger is oriented such that the normal axis (NA) is substantially parallel to the transverse direction (Y).

8. The wind turbine of claim 1, wherein each cooling unit further comprises first and second side walls positioned at opposing ends of the deflector plate, wherein the first and second side walls cooperate with the deflector plate to direct the incoming wind through the heat exchanger.

9. A method for assembling a modular cooler on a nacelle of a wind turbine, the nacelle having a longitudinal axis (LA) configured to be aligned with the direction of the flow of the incoming wind during operation of the wind turbine, wherein when so aligned, the nacelle defines a longitudinal direction (X), a traverse direction (Y), and a vertical direction (Z), the method comprising:
providing one or more cooling modules, each cooling module including one or more cooling units, each cooling unit comprising:
a heat exchanger having a cooling area, the cooling area defining a normal axis (NA); and
a deflector plate;
attaching the one or more cooling modules to the nacelle in an orientation such that the normal axis (NA) of the heat exchanger of the one or more cooling units is non-parallel to the longitudinal axis (LA) of the nacelle; and
positioning the deflector plate relative to the heat exchanger of the one or more cooling units to initially be engaged by the incoming wind, thereby diverting the flow of the incoming wind so as to direct the flow of the incoming wind through the heat exchanger, the deflector plate being positioned so as to define an angle between the deflector plate and the longitudinal axis (X) upstream of the deflector plate that is less than 180°.

10. The method of claim 9, wherein the one or more cooling modules includes a plurality of cooling units and the step of attaching the one or more cooling units includes arranging the plurality of cooling units adjacent each other in a direction along at least one of the longitudinal direction (X), traverse direction (Y), and vertical direction (Z).

11. The method of claim 9, wherein the modular cooler includes a plurality of cooling modules and the step of attaching the one or more cooling modules includes arranging the plurality of cooling modules adjacent each other along at least one of the longitudinal direction (X), traverse direction (Y), and vertical direction (Z).

12. The method of claim 9, wherein the heat exchanger includes a plurality of heat transfer panels and the step of attaching the one or more cooling modules includes arranging the plurality of heat transfer panels adjacent each other in the longitudinal direction (X) of the nacelle, and wherein the step of positioning the deflector plate includes positioning the deflector plate relative to the heat exchanger such that the incoming wind is directed to each of the plurality of heat transfer panels.

13. The method of claim 9, wherein the step of attaching the one or more cooling modules includes orienting the heat exchanger such that the normal axis (NA) is substantially parallel to the vertical direction (Z).

14. The method of claim 9, wherein the step of attaching the one or more cooling modules includes orienting the heat exchanger such that the normal axis (NA) is substantially parallel to the transverse direction (Y).

15. The method of claim 9, further comprising:
positioning first and second side walls at opposing ends of the deflector plate, wherein the first and second side walls cooperate with the deflector plate to direct incoming wind through the heat exchanger.

16. A modular cooler for a nacelle of a wind turbine, the nacelle having a longitudinal axis (LA) configured to be aligned with the direction of the flow of the incoming wind during operation of the wind turbine, wherein when so aligned, the nacelle defines a longitudinal direction (X), a traverse direction (Y), and a vertical direction (Z), the modular cooler comprising:

one or more cooling modules, each cooling module including one or more cooling units, each cooling unit comprising:
a heat exchanger having a cooling area defining normal axis (NA); and
a deflector plate configured to be initially engaged by the incoming wind, thereby by diverting the flow of the incoming wind so as to be directed through the heat exchanger,
wherein the deflector plate is positioned to define an angle between the deflector plate and the longitudinal axis (X) upstream of the deflector plate that is less than 180°, and
wherein each of the one or more cooling units of the modular cooler is configured to be oriented such that the normal axis (NA) of the heat exchanger is non-parallel to the longitudinal axis (LA) of the nacelle when the modular cooler is affixed to the nacelle.

17. The modular cooler of claim 16, wherein the one or more cooling modules includes a plurality of cooling units configured to be arranged adjacent each other along at least one of the longitudinal direction (X), traverse direction (Y), and vertical direction (Z).

18. The modular cooler of claim 16, wherein the modular cooler includes a plurality of cooling modules configured to be arranged adjacent each other along at least one of the longitudinal direction (X), traverse direction (Y), and vertical direction (Z).

19. The modular cooler of claim 16, wherein the heat exchanger includes a plurality of heat transfer panels configured to be arranged adjacent each other in the longitudinal direction (X) of the nacelle.

20. The modular cooler of claim 16, wherein the heat exchanger is configured to be oriented such that the normal axis (NA) is substantially parallel to the vertical direction (Z) or the transverse direction (Y).

* * * * *